(12) United States Patent
Chaturvedi et al.

(10) Patent No.: US 11,348,013 B2
(45) Date of Patent: May 31, 2022

(54) DETERMINING, ENCODING, AND TRANSMISSION OF CLASSIFICATION VARIABLES AT END-DEVICE FOR REMOTE MONITORING

(71) Applicant: ONCE LABS INC., San Diego, CA (US)

(72) Inventors: Rahul Chaturvedi, San Diego, CA (US); Avinash Jain, San Diego, CA (US)

(73) Assignee: VIE TECHNOLOGIES INC., San Diego, CA (US)

( * ) Notice: Subject to any disclaimer, the term of this patent is extended or adjusted under 35 U.S.C. 154(b) by 117 days.

(21) Appl. No.: 16/758,107

(22) PCT Filed: Oct. 30, 2018

(86) PCT No.: PCT/US2018/058132
§ 371 (c)(1),
(2) Date: Apr. 22, 2020

(87) PCT Pub. No.: WO2019/089533
PCT Pub. Date: May 9, 2019

(65) Prior Publication Data
US 2020/0341878 A1    Oct. 29, 2020

Related U.S. Application Data

(60) Provisional application No. 62/579,849, filed on Oct. 31, 2017, provisional application No. 62/579,852, filed on Oct. 31, 2017.

(51) Int. Cl.
*G06N 5/02*     (2006.01)
*G06N 20/00*    (2019.01)
(Continued)

(52) U.S. Cl.
CPC ............ *G06N 5/02* (2013.01); *G01M 99/005* (2013.01); *G06F 11/008* (2013.01);
(Continued)

(58) Field of Classification Search
CPC ..... G06N 5/02; G06F 11/008; G06F 11/3006; G06F 11/3072; G06F 11/3089; G06F 11/08; G01M 99/005; G06Q 10/20
See application file for complete search history.

(56) References Cited

U.S. PATENT DOCUMENTS

| | | | |
|---|---|---|---|
| 6,553,336 B1* | 4/2003 | Johnson ................ | G08B 25/08 |
| | | | 702/188 |
| 2003/0045946 A1* | 3/2003 | Hattori ............... | G05B 23/0267 |
| | | | 700/27 |

(Continued)

*Primary Examiner* — Ojiako K Nwugo
(74) *Attorney, Agent, or Firm* — Hunter Clark PLLC

(57) ABSTRACT

Techniques for operating a remote monitoring system are provided. An example method according to these techniques includes sensing one or more characteristics associated with a monitored asset to produce sensor data, and dynamically configuring operating parameters of the monitoring system based at least in part on current operating conditions of the monitoring system. The example method also includes extracting features from the sensor data using the feature extraction component to produce extracted feature information, and selecting at least a subset of the extracted feature information using the feature extraction component to produce active feature information based at least in part on the current operating conditions of the monitoring system. The example method also includes sending, through a communications network, the active feature information to a server.

25 Claims, 15 Drawing Sheets

(51) Int. Cl.
  *G01M 99/00* (2011.01)
  *G06Q 10/00* (2012.01)
  *G06F 11/00* (2006.01)
  *G06F 11/30* (2006.01)
  *G08B 1/08* (2006.01)

(52) U.S. Cl.
  CPC ...... *G06F 11/3006* (2013.01); *G06F 11/3072* (2013.01); *G06F 11/3089* (2013.01); *G06N 20/00* (2019.01); *G06Q 10/20* (2013.01); *G08B 1/08* (2013.01)

(56) References Cited

U.S. PATENT DOCUMENTS

| | | | |
|---|---|---|---|
| 2010/0201516 A1* | 8/2010 | Gelvin | G06F 15/173 340/539.26 |
| 2013/0197322 A1* | 8/2013 | Tran | A61B 5/0077 600/301 |
| 2013/0272160 A1* | 10/2013 | Duggisetty | H04L 61/103 370/254 |
| 2015/0125832 A1* | 5/2015 | Tran | G09B 19/0092 434/127 |
| 2017/0259942 A1* | 9/2017 | Ziarno | G07C 5/085 |
| 2017/0276571 A1* | 9/2017 | Vitullo | G06Q 10/06 |
| 2018/0173216 A1* | 6/2018 | Spiro | G05B 23/0237 |
| 2019/0285517 A1* | 9/2019 | Lou | G06N 3/088 |

\* cited by examiner

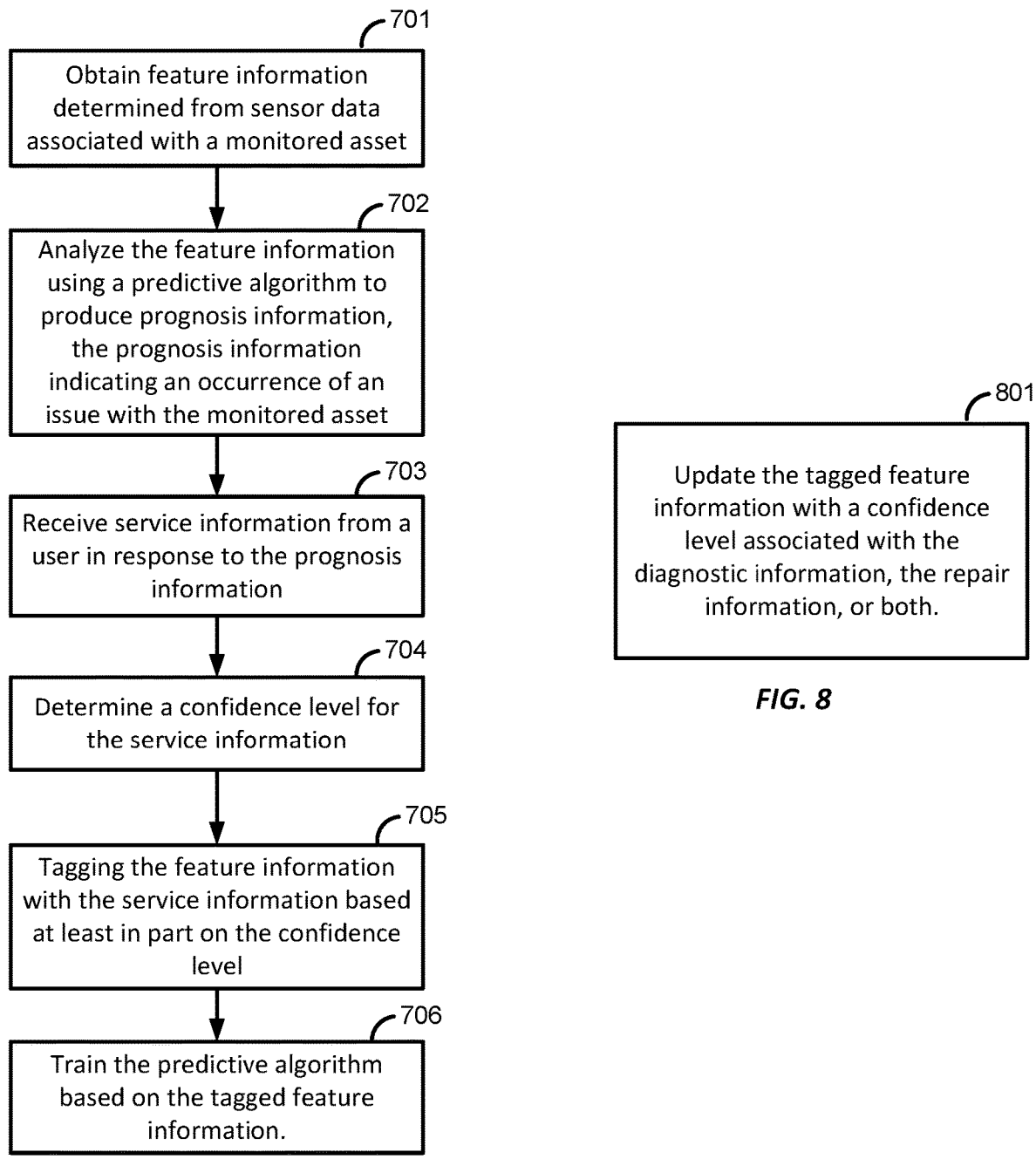

DETERMINING, ENCODING, AND TRANSMISSION OF CLASSIFICATION VARIABLES AT END-DEVICE FOR REMOTE MONITORING

BACKGROUND

Sensor technology has enabled sensors to be deployed in various settings where direct monitoring of assets may be difficult or impractical. Wireless sensor technology has made it possible to collect vast amounts of information about these assets. However, utilizing this information to improve the function of the monitored assets has proved to be challenging.

SUMMARY

An example method for operating a monitoring system according to the disclosure includes sensing one or more characteristics associated with a monitored asset to produce sensor data; dynamically configuring operating parameters of the monitoring system based at least in part on current operating conditions of the monitoring system; extracting features from the sensor data using the feature extraction component to produce extracted feature information; selecting at least a subset of the extracted feature information using the feature extraction component to produce active feature information based at least in part on the current operating conditions of the monitoring system; and sending, through a communications network, the active feature information to a server.

Implementations of such a method can include one or more of the following features. Dynamically configuring the operating parameters of the feature extraction component of the monitoring system includes receiving configuration information from the server, and modifying the operating parameters of the feature extraction component of the monitoring system according to the configuration information. The configuration information indicates a change in a sleep period of the monitoring system, sample rate of the monitoring system, or both. The configuration information identifies one or more features to add, one or more features to remove, or one or more features to modify, or a combination thereof, from the active feature information. The method includes sensing the one or more characteristics associated with the monitored asset to produce additional sensor data, extracting features from the additional sensor data using the feature extraction component to produce second extracted feature information, selecting at least a subset of the second extracted feature information using the feature extraction component to produce second active feature information, and sending, via the communications network, the second active feature information to the server. The configuration information from the server comprises rate change information, and the method includes adjusting a sensing rate at which the sensor data is produced by the monitoring system, a rate at which feature extraction is performed by the monitoring system, a rate at which feature information is sent to the server, or a combination thereof, based on the rate change information. Dynamically configuring the operating parameters of the feature extraction component of the monitoring system includes determining a dynamic baseline value for one or more features, wherein the dynamic baseline value represents an expected value for each of the one or more features over time. The method includes identifying a deviation in the dynamic baseline value for a feature of the one or more features, and modifying the operating parameters of the feature extraction component to include the identified feature in the features of the subset of the extracted feature information. The method includes sensing the one or more characteristics associated with the monitored asset to produce additional sensor data, extracting features from the additional sensor data using the feature extraction component to produce second extracted feature information, selecting at least a subset of the second extracted feature information using the feature extraction component to produce second active feature information wherein feature information for the identified feature is included in the second active feature information, and sending, via the communications network, the second active feature information to the server.

An example monitoring system according to the disclosure includes a sensor, a wireless transceiver, and a processor. The sensor is configured to sense one or more characteristics associated with a monitored asset and to produce sensor data. The wireless transceiver is configured to transmit data to and receive data from a server via a communication network. The processor is configured to obtain the sensor data from the sensor; dynamically configure operating parameters of the monitoring system based at least in part on current operating conditions of the monitoring system; extract features from the sensor data using the feature extraction component to produce extracted feature information; select at least a subset of the extracted feature information using the feature extraction component to produce active feature information based at least in part on the current operating conditions of the monitoring system; and send the active feature information to the server using the wireless transceiver.

Implementations of such a monitoring system can include one or more of the following features. The processor being configured to dynamically configure the operating parameters of the feature extraction component of the monitoring system is further configured to receive configuration information from the server via the wireless transceiver, and modify the operating parameters of the feature extraction component of the monitoring system according to the configuration information. The configuration information indicates a change in a sleep period of the monitoring system, sample rate of the monitoring system, or both. The configuration information identifies one or more features to add, one or more features to remove, or both, from the active feature information. The sensor is further configured to sense the one or more characteristics associated with the monitored asset to produce additional sensor data, and the processor is further configured to extract features from the additional sensor data using the feature extraction component to produce second extracted feature information, select at least a subset of the second extracted feature information using the feature extraction component to produce second active feature information, and send, via the communications network, the second active feature information to the server. The configuration information from the server comprises rate change information, and the processor is further configured to adjust a sensing rate at which the sensor data is produced by the monitoring system, a rate at which feature extraction is performed by the monitoring system, a rate at which feature information is sent to the server, or a combination thereof, based on the rate change information. The processor being configured to dynamically configure the operating parameters of the feature extraction component of the monitoring system is further configured to determine a dynamic baseline value for one or more features, wherein the dynamic baseline value represents an expected value for each of the one or more features over time. The processor is further configured to identify a deviation in the dynamic baseline value for a feature of the one or more features, and update the operating parameters of the feature extraction component to include the identified feature in the features of the subset of the extracted feature information.

An example non-transitory, computer-readable medium, according to the disclosure has stored thereon computer-readable instructions operating for operating a monitoring system. The instructions are configured to cause the monitoring system to: sense one or more characteristics associated with a monitored asset to produce sensor data; dynamically configure operating parameters of the monitoring system based at least in part on current operating conditions of the monitoring system; extract features from the additional sensor data using the feature extraction component to produce extracted feature information; select at least a subset of the extracted feature information using the feature extraction component to produce active feature information based at least in part on the current operating conditions of the monitoring system; and send, through a communications network, the active feature information to a server.

Implementations of such a non-transitory, computer-readable medium may include one or more of the following features. The instructions configured to cause the monitoring system to dynamically configure the operating parameters of the feature extraction component of the monitoring system further comprise instructions configured to cause the monitoring system to receive configuration information from the server via the wireless transceiver, and modify the operating parameters of the feature extraction component of the monitoring system according to the configuration information. The configuration information indicates a change in a sleep period of the monitoring system, sample rate of the monitoring system, or both. The configuration information identifies one or more features to add, one or more features to remove, or one or more features to modify, or a combination thereof, from the active feature information. The medium includes instructions configured to cause the monitoring system to sense the one or more characteristics associated with the monitored asset to produce additional sensor data, extract features from the additional sensor data using the feature extraction component to produce second extracted feature information, select at least a subset of the second extracted feature information using the feature extraction component to produce second active feature information, and send, via the communications network, the second active feature information to the server. The configuration information from the server comprises rate change information, and the medium includes instructions configured to cause the monitoring system to adjust a sensing rate at which the sensor data is produced by the monitoring system, a rate at which feature extraction is performed by the monitoring system, a rate at which feature information is sent to the server, or a combination thereof, based on the rate change information. The instructions configured to cause the processor to dynamically configure the operating parameters of the feature extraction component of the monitoring system further comprise instructions configured to cause the monitoring system to determine a dynamic baseline value for one or more features, wherein the dynamic baseline value represents an expected value for each of the one or more features over time. The medium includes instructions configured to cause the monitoring system to identify a deviation in the dynamic baseline value for a feature of the one or more features, and update the operating parameters of the feature extraction component to include the identified feature in the features of the subset of the extracted feature information.

BRIEF DESCRIPTION OF THE DRAWING

FIG. 7 is a flow diagram of another example process for monitoring an asset and for generating a prognosis for the monitored asset.

FIG. 8 is a diagram of an example of an additional stage that may be used to implement an additional stage of the process illustrated in FIG. 7.

FIG. 23 is an example state diagram illustrating an example of various states that a sensor may transition between.

DETAILED DESCRIPTION

Techniques for operating a remote monitoring system are provided for monitoring one or more assets. The monitored assets may be deployed in an industrial setting or other environment where it is impractical or impossible to continually monitor the status of these assets without automated assistance. The techniques disclosed herein may be used to monitor the condition, health, and utilization patterns of one or more monitored assets using sensors configured to sense one or more characteristic associated with each monitored asset.

A remote monitoring system may produce prognosis information for the monitored asset(s) using one or more predictive algorithms configured to analyze feature information extracted from sensor data. The prognosis information may indicate the occurrence or impending occurrence or expected (or anticipated) occurrence of a possible condition (also referred to herein as a "condition of interest") with the monitored asset. The prognosis information may indicate that the monitored asset is healthy and operating as it should be. The prognosis information may indicate that the monitored asset requires attention or requires urgent attention in which the monitored asset requires maintenance or repair. The prognosis information may be provided to a technician or other user who may verify whether the prognosis information produced by the predictive algorithm was correct. The user may provide service information, which may include diagnostic information indicative of whether the prognosis information was correct, and/or repair information that indicates whether the user performed repairs and/or maintenance on the monitored asset. The remote monitoring system may refine the predictive algorithms used to produce the prognosis information based on the service information provided by the user.

Figure 1:
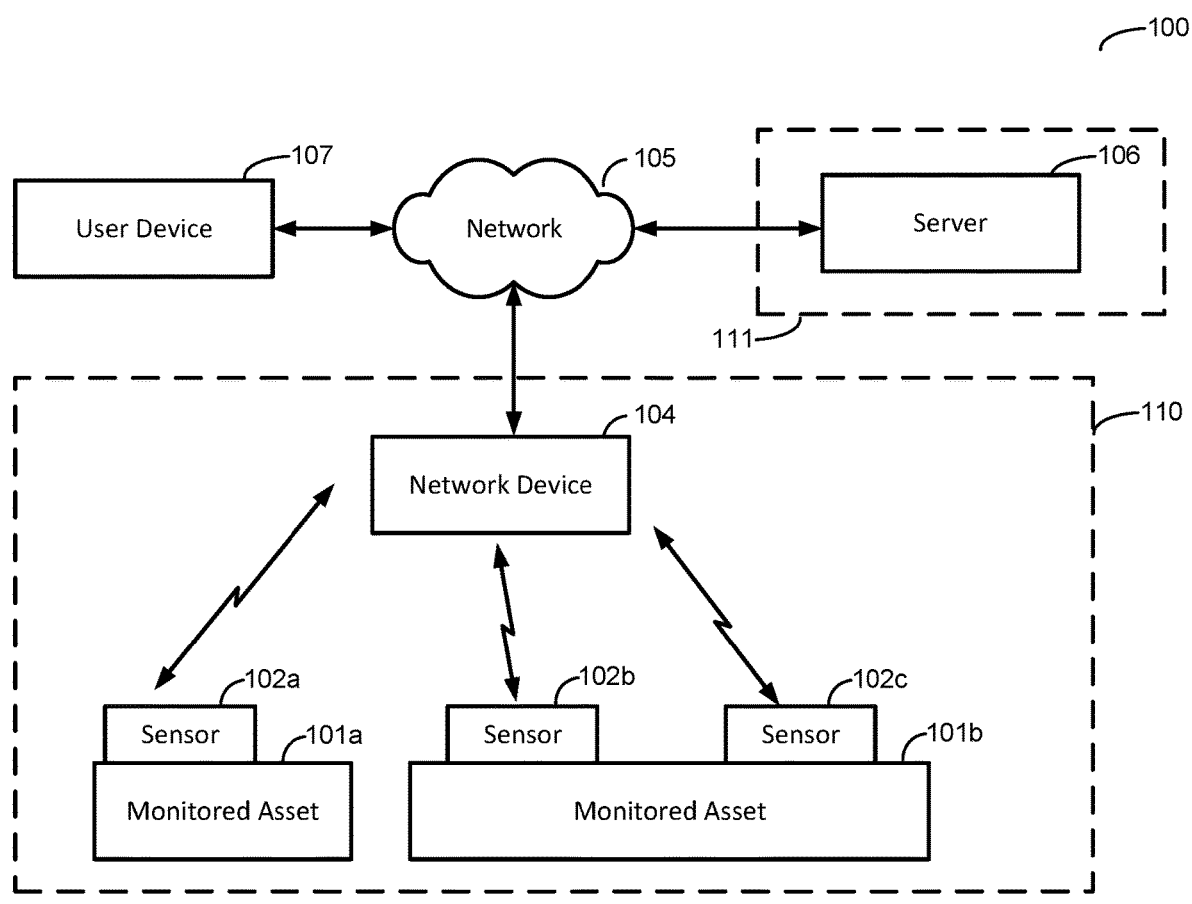
FIG. 1 is a block diagram of an example operating environment that may be used to implement various techniques disclosed herein.

FIG. 1 is a block diagram of an example operating environment 100 in which a monitoring system according to the disclosure may be implemented. The monitoring system includes a front-end portion 110 and a back-end portion 111. The front-end portion 110 in this example implementation includes one or more monitored assets, such as a monitored asset 101a and a monitored asset 101b, and one or more sensors, such as a sensor 102a, a sensor 102b, and a sensor 102c. The front-end portion 110 may also include a network device 104. The back-end portion 111 of the monitoring system may include a server, such as a server 106. The front-end portion 110 of the monitoring system may be remotely located from the back-end portion 111 of the monitoring system, and the front-end portion 110 and the back-end portion 111 may be communicably coupled with a network, such as network 105. The operating environment 100 may also include a user device 107 that is configured to communicate with the server 106 via the network.

The front-end portion 110 of the monitoring system may be located at a location where one or more monitored assets, such as the monitored asset 101a and the monitored asset 101b, are located. The example operating environment 100 includes two monitored assets. Other implementations may include a single monitored asset or may include more than two monitored assets. Furthermore, the monitored assets may include more than one monitored asset of the same type or a combination of multiple types of monitored assets. A monitored asset may be any type of object for which sensor data may be collected. In some implementations, the monitored asset may not require a separate sensor and can be configured to provide information to the server which can be used to determine a prognosis.

A monitored asset may comprise a piece of equipment or machinery, or a component thereof, for which sensor data may be collected and for which prognosis information identifying an occurrence of a possible condition of the monitored asset may be determined. Some examples of such monitored assets include, but are not limited to, motors, generators, pumps, valves, components of heating, ventilation, and air conditioning (HVAC) systems, gas turbines, wind turbines, mining or logging equipment, and process equipment used by the refining and processing industries to convert raw materials into products or refined materials. A monitored asset may also be other types of objects that may be monitored and for which remote monitoring may be desirable. For example, the techniques disclosed herein could be used to monitor agricultural assets, such as a crops or livestock. The techniques disclosed herein could also be used to monitor the status of infrastructural elements, such as road, traffic signals, bridges, tunnels, buildings, or other such infrastructural elements. These techniques could also be used to monitor natural features, such as a lake, a stream, plant life, or animal life for which sensor data may be collected and analyzed to identify an occurrence of a condition of the monitored asset. These examples are provided to illustrate the flexibility of the techniques disclosed herein and do not limit these techniques to these specific types of monitored assets.

Each monitored asset 101 may be associated with one or more sensors 102. A sensor 102 may sense one or more characteristics associated with a monitored asset and to produce sensor data. In this example, monitored asset 101a is associated with sensor 102a, and monitored asset 101b is associated with sensor 102b and the sensor 102c. A sensor 102 may comprise more than one type of sensor (e.g., a vibration sensor and a temperature sensor). Other types of sensors, such as but not limited to magnetometers, accelerometers, gyroscopes, visible light sensors, infrared sensors, ultraviolet sensors, temperature sensors, fluid sensors, pressure sensors, optical sensors, radiation sensors, vibration sensors, chemical sensors, acoustic sensors other types of sensors, or a combination thereof, may be utilized depending on the type of monitored asset 101 for which sensor data are being collected.

The sensor(s) 102 may extract feature information from the sensor data and to communicate the sensor data, the feature information, or both to the server 106. The sensor(s) 102 may determine, at least in part, which features to extract from the sensor data. The sensor 102 may perform feature extraction in which the sensor data obtained by one or more sensor(s) of the sensor 102 are analyzed to produce information that may be used by one or more predictive algorithms utilized by the server 106 to discriminate between possible conditions of a monitored asset. For example, the features may serve as classification variables that may be used by a classification aspect of the predictive algorithms to identify the occurrence or impending occurrence of a possible condition of the monitored asset 101. The values of various features or combinations thereof may be indicative of the different possible conditions for which the predictive algorithms have been trained.

The sensor(s) 102 may wirelessly communicate with the network device 104. The network device 104 may relay raw sensor data, processed sensor data (e.g., the feature information), or a combination thereof to the server 106. The network device 104 may also be configured to relay configuration information from the server 106 to the sensor(s) 102. The network device 104 may comprise a router, a wireless access point, a wireless base station, or other device configured to wirelessly communicate with the sensor 102a, the sensor 102b, and the sensor 102c. The network device 104 may be operated by an owner or operator of the monitored assets or may be operated by a third party, such as a network service provider. The network device 104 may be connected to a backhaul connection to a network, such as the network 105. The network 105 may comprise one or more public networks, one or more private networks, or a combination thereof. The network 105 may be, at least in part, the set of interconnected networks referred to as the Internet.

The sensor(s) 102 may be powered by a battery and/or other onboard power source. The sensor(s) 102 may send the feature information, but not the sensor data, to the server 106, which may conserve power and/or reduce the amount of network bandwidth used to transmit data to the server 106. The sensor(s) 102 may send the sensor data to the server 106 in response to a request for the sensor data from the server 106. The sensor(s) 102 may store sensor data, feature information, or both for at least a period of time and to provide the sensor data to the server 106 on demand.

The sensors of the sensor(s) 102 may produce a large amount of data that may be processed and used to produce prognosis information for the monitored asset 101. The processing of the sensor data may be distributed between the sensor(s) 102 and the server 106 by having the feature information extracted from the sensor data at the sensor(s) 102. This approach may significantly reduce the amount of data that the sensor(s) transmits to the server 106. The feature information is derived from the sensor data and may be significantly smaller in size than the sensor data. Thus, the sensor(s) 102 may not use high-capacity transmission links to send data from the sensor(s) 102 to the server 106. The sensor(s) 102 may include low-power wireless transmitters that may provide long-range wireless data transmissions.

The sensor(s) 102 may comprise Internet of Things (IoT) devices that are configured to be deployed in an operating environment, such as that illustrated in FIG. 1, and to wirelessly communicate with the server 106 and/or other networked components of the monitoring system. IoT provides a framework for internetworking devices such as the sensor(s) 102 and provides a means for automating the monitoring of assets, such as the monitored asset(s) 101 illustrated in FIG. 1. The sensors(s) 102 may support one or more IoT communications protocols, including but not limited to the Enhanced Machine-Type Communication (eMTC) protocol, the Narrowband Internet of Things (NB-IoT) protocol, and/or the Lightweight Machine-to-Machine (LwM2M) protocol. The sensors(s) 102 utilize one or more IoT communications protocols to send sensor data, feature information extracted from the sensor data, other information, or a combination thereof to the server 106. The server 106 may use one or more IoT protocols to send communication control signals, sensor configuration information, or a combination thereof to the sensor(s) 102. The server 106 may send sensor configuration information to the sensor(s) 102 that facilitates the reconfiguration of operating parameters of the sensor(s) 102 without requiring the sensor(s) 102 already disposed in an operating environment to be manually reconfigured or replaced.

The server 106 may use one or more predictive algorithms to make a determination that a condition has or is likely to occur with a monitored asset 101 and to produce prognosis information for the monitored asset 101. The server 106 may make this determination based on feature information collected by the sensor(s) 102 associated with the monitored asset 101. While referred to herein as predictive algorithms, this includes the use of a single algorithm, and the algorithms may include both predictive and classification aspects. The classification aspect may include, for example, making a determination whether feature information obtained for a monitored asset is indicative of one of a discrete number of possible conditions that the predictive algorithms have been trained to identify as having occurred or the occurrence of which is imminent. The predictive aspect may include, for example, making a determination as to a likelihood that the monitored asset will fail or malfunction, and/or likelihood that the condition of the monitored asset 101 will deteriorate. The predictive aspect is not limited to these particular examples and may determine a likelihood of the occurrence of other events related to the monitored asset 101. The prognosis information generated for the monitored asset may include information provided by the classification aspect, the predictive aspect, or both. The output of the classification aspect may be used to aid diagnosis of a condition of the monitored asset 101 by identifying that a possible condition has occurred or is imminent (e.g., within a future threshold amount of time) based on the feature information collected by the sensor(s) 102.

The server 106 may obtain feature information associated with sensor data associated with a monitored asset, and to analyze the feature information using the predictive algorithms to produce prognosis information. The predictive algorithms used by the server 106 may be trained using feature information that has been "tagged" or labeled to indicate that a certain possible condition of the monitored asset 101 is present. A possible condition is a state of the monitored asset for which the predictive algorithms have been trained to recognize using tagged feature information which has been associated with a label identifying the possible condition. The tagged data may include values for one or more of the features indicative of the occurrence of that condition. Once the predictive algorithms have been trained, the predictive algorithms may be provided with untagged data. The predictive algorithms may be used to analyze the untagged data using regression, classification, neural networks, deep learning, machine learning, or other techniques, or a combination thereof to produce prognosis information for the monitored asset for which the untagged feature information was obtained.

The prognosis information produced by the server 106 may include information indicative of an occurrence of a possible condition of the monitored asset. The server 106 may also be configured to receive service information from a user in response to the prognosis information. The service information may include diagnostic information, repair information, or both that may be used by the server 106 to confirm whether the prognosis information was correct. Having a user visit the monitored asset and provide an assessment whether the prognosis information produced by the predictive algorithm is correct or accurate may provide feedback that may be used to refine the predictive algorithms used by the server 106. The examples that follow will discuss example types of information that the user may provide and how this information may be used to influence the predictive algorithms used by the server 106. The training of the predictive algorithms may be revised based on the service information or other information that is collected during operation of the monitoring system. The server 106 may tag feature information that was used to generate the prognosis information in response to the service information indicating that the prognosis information was correct. The service information may be included in the tagged feature information that is used to refine the predictive algorithms used by the server. The tagged feature information can include diagnostic information provided by the user, repair information provided by the user, or both. This continued refinement of the predictive algorithms is discussed in greater detail in the example implementations that follow.

The server 106 may transmit prognosis information for a monitored asset to the user device 107. The user device 107 may be a computing device associated with a user. The user device 107 may be communicably coupled with the server 106 via the network 105. The user device 107 may be, for example, a smartphone, a tablet computing device, laptop, or other portable computing device. The user device 107 may also be stationary or substantially stationary, such as a desktop computing device.

The server 106 may transmit the prognosis information for the monitored asset to the user device 107 as a work order or other request to have a user of the user device 107 check on the monitored asset. The user may be a technician or other person who may physically check on the monitored asset to verify whether the prognosis information produced by the server 106 is correct. The user may provide service information to the server 106 via the user device 107. The service information may include diagnostic information, repair information, or both. The diagnostic information may include information indicative of whether the prognosis information produced by the server 106 for the monitored asset was correct. The diagnostic information may include an indication of an actual condition of the monitored asset, e.g., if the prognosis information was incorrect. The indication of the actual condition may be used to refine the predictive algorithms to better predict the condition of the monitored asset based on the sensor data (e.g., to better predict the condition of the monitored asset when presented in the future with sensor data that are similar to the sensor data that resulted in an incorrect prediction this time). The repair information may comprise information indicative of repairs or maintenance performed on the monitored asset in response to the prognosis information.

The server 106 may utilize the service information to confirm whether the prognosis information for the monitored asset was correct. The server 106 may also be configured to determine condition resolution information for the monitored asset. The condition resolution information may be determined by obtaining additional sensor data associated with the monitored asset from the sensor(s) associated with the monitored asset, and whether the condition of the monitored asset has been resolved.

The server 106 may refine the predictive algorithms used to generate the prognosis information. One scenario where the predictive algorithms may be refined is when the diagnostic information, repair information, or both provided by the user confirms the prognosis information produced by the predictive algorithms. In this scenario, the predictive algorithms appear to have correctly identified the occurrence of a possible condition of the monitored asset 101 in untagged feature information obtained for the monitored asset 101. The server 106 may tag the formerly untagged feature information to indicate that the feature information is indicative of the occurrence of the possible condition. The diagnostic information, the repair information, or both provided by the user may also be included with the tagged data. The tagged feature information may be used by the server 106 to refine the training of the predictive algorithms.

Another such scenario where the predictive algorithm(s) may be refined is when the diagnostic information, the repair information, or both provided by the user does not support or contradicts the prognosis information produced by the predictive algorithm(s). The prognosis information may be incorrect, the diagnostic information or repair information may be incorrect, or a combination thereof. The predictive algorithm(s) may have incorrectly identified the condition of the monitored asset. The user may also have misdiagnosed the condition of the monitored asset and may have made incorrect or unnecessary repairs. Where the diagnosis information, the repair information, or both contradict the prognosis information, the server 106 may assess whether to adopt the prognosis information and to disregard or discount the diagnostic information.

The server 106 may associate a confidence level with the prognosis information, for example, based in part on historical data collected for the monitored asset. The server 106 may disregard or discount (e.g., not completely disregard, but use a weighting between 1.0 and 0) service information provided by the user that is contrary to the prognosis information if the confidence level associated with the prognosis information exceeds a predetermined threshold. The server 106 may disregard or discount the service information by not including this user-provided information when producing tagged feature information for training the predictive algorithms, or by including the service information but applying a weighting to the service information (and/or applying a weighting to the prognosis information). The confidence level associated with the prognosis information may also be based at least in part on historical data collected for other monitored assets of a same or similar type of asset as the monitored asset for which the prognosis information was generated. The server 106 may also be configured to associate a confidence level with the service information provided by the user based on attributes of the user, such as but not limited to an experience level of the user, an amount of experience that the user has with the particular type of monitored asset, how often the user has correctly or incorrectly diagnosed issues related to this monitored asset (or similar types of monitored assets) or correctly or incorrectly diagnosed issues related to other monitored assets, or other factors that may be relevant to the accuracy of the service information provided by the user. In some implementations, the confidence level associated with the service information may be based at least in part on the consistency between the diagnostic information and the repair information provided by the user. For example, the monitored asset 101 may be a motor, and the server 106 may generate prognosis information indicative of an issue with a bearing of the motor. The server 106 may further generate more detailed prognosis information indicative of an issue with a bearing "inner race." A user may assess the bearing and make repairs. The diagnostic information provided by the user may indicate that the bearing had a "bad inner race," and the repair information may indicate that the "inner race was replaced." The service information may be indicated to have a high confidence level in this situation (which could be a quantitative value, an enumerated value or a qualitative value) because both the diagnostic information and the repair information were consistent with the prognosis information. Furthermore, where the service information is consistent with the prognosis information that was produced for the monitored asset 101, the prognosis information may be indicated to have a high confidence level.

Determining a confidence level and comparing the confidence level to a threshold may use a confidence level that is quantitative in nature. For example, a confidence level with a range between 1 and 10 may be used, with a value of 1 indicating low confidence and a value of 10 indicating high confidence. A confidence level may, for example, be computed based upon a combination of inputs, including one or more inputs of a user confidence (e.g., user input following diagnosis and/or repair), a user experience value and the equivalence between the prognosis information and the service information. A confidence level may, for example, be computed using a weighted, linear or non-linear combination of the inputs. A confidence level may be compared to a threshold value. The server 106 may be configured such that if a confidence level is at or above a threshold, then server 106 tags the feature information used to generate the prognosis information or feature information obtained around the time that the prognosis information was generated with a label indicative of a condition of the monitored asset 101 that was identified in the prognosis information. The server 106 may also be configured to include the confidence level information with the tagged feature information. Alternatively, the threshold may be set to 0, and the server 106 may tag feature information and include the computed confidence level in the tag or label. The tagged feature information may be used to refine the training of the predictive algorithms. Tagging of the feature information is discussed in greater detail in the various example implementations that follow.

Alternatively, the confidence level and threshold may be non-quantitative in nature and may be represented by non-quantitative mechanisms. Examples of non-quantitative mechanisms include (a) the logical match between prognosis and diagnostic information, (b) the logical equivalence between prognosis, diagnostic information and repair information, or (c) the logical equivalence between prognosis, diagnostic information and repair information plus a second prognosis, following user repair of the asset which confirms the successful repair of the asset. In an example implementation, the confidence level may be represented as an enumerated set of confidence values that includes "high," "medium," and "low" confidence levels. The high confidence level may be selected where the diagnostic information or the diagnostic information and the repair information correlate with the prognosis information, such as in the bearing example discussed above. The medium confidence level may be selected where the diagnostic information or the repair information indicate that there is a problem with the monitored asset 101, but the prognosis information was not entirely correct. For example, referring back to the bearing example, assume that the prognosis information correctly identified that there was an issue with the bearing, but in this additional example the exact prognosis does not match the actual condition indicated by the service information. In this additional example, the prognosis information indicates an inner race problem, but the diagnostic information and the repair information indicate an outer race problem or misalignment. The confidence level in the prognosis may be marked as "medium confidence" in these examples. The server 106 may use this confidence level information to indicate that the predictive algorithms may be further refined with new training data that may help distinguish between these situations. The new training data may be generated by associating a label with the feature information used to generate the prognosis information or feature information collected from a time period near when the prognosis information was generated. The label represents a condition of the monitored asset 101 that the predictive algorithms are trained to recognize. An indication may be included with the feature information that identifies whether or not the feature information is indicative of the condition of the monitored asset that was identified in the prognosis information. The inclusion of training data that is not indicative of a particular condition of the monitored asset may be used to refine the training of the predictive algorithms and may reduce false positives. Finally, the low confidence level may be selected where the diagnostic information indicates that the monitored asset 101 appears to be operating correctly. The server 106 may also use this confidence level information to indicate that the predictive algorithms may be further refined with new training data that may help distinguish between these situations. These examples are illustrative and do not limit the techniques disclosed herein to these specific confidence levels.

In some implementations, the confidence level may be assumed. For example, the user or other technician may make repairs to the monitored asset 101 in response to receiving the prognosis information without expressly providing specific diagnostic information. The server 106 may assume that the prognosis information was correct in this situation and may assign a confidence level to the prognosis information. In some implementations, the assumed confidence level in the prognosis information may be based on a confidence level associated with the service information. Various combinations of quantitative, logical, and assumed confidence levels and thresholds may be used.

The server 106 may disregard or discount the diagnostic information, the repair information, or both provided by the user in response to the confidence level associated with the prognosis information exceeding the confidence level associated with the diagnostic information. Also, or alternatively, the server 106 may request that the status of the monitored asset 101 be reassessed and new service information provided in response to the confidence level associated with the prognosis information exceeding the confidence level associated with the diagnostic information. A different or more experienced user may be able to provide a more reliable assessment the status of the asset. The server 106 may reassess the prognosis information and to refine the predictive algorithms in response to multiple users providing diagnostic information that is contrary to the prognosis information.

Figure 2:
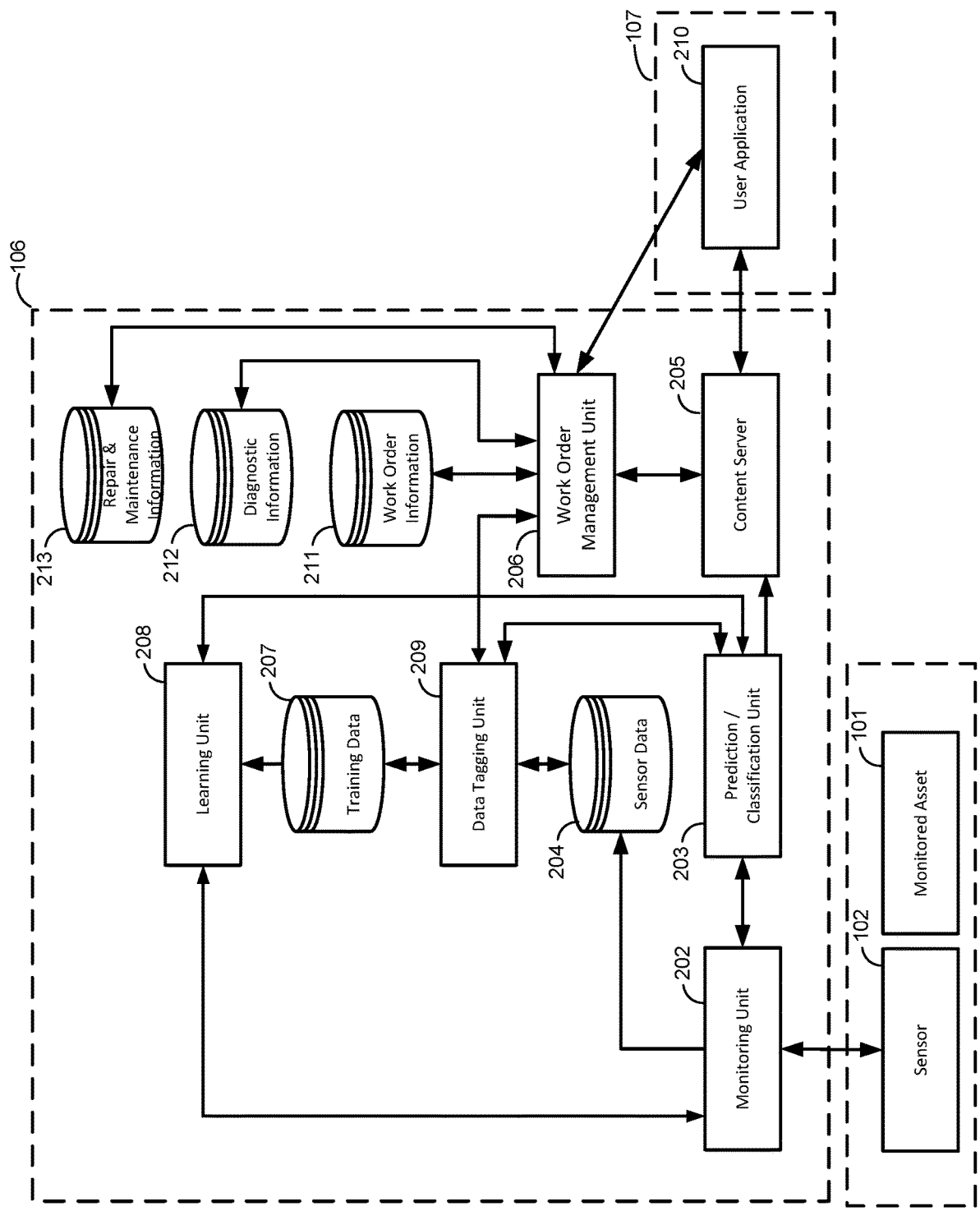
FIG. 2 is a block diagram that provides additional details of several of the components illustrated in the example operating environment of FIG. 1.

Referring also to FIG. 2, the server 106 may include a monitoring unit 202, a prediction/classification unit 203, a sensor data repository 204, a content provider 205, a work order management unit 206, a training data repository 207, a learning unit 208, and a data tagging unit 209. The user device 107 may include a user application 210.

The monitoring unit 202 may send data to and receive data from the sensor(s) 102. The monitoring unit 202 may communicate with the sensor(s) 102 via the network 105 and the network device 104. The sensor(s) 102 may send sensor data, feature information, or both to the monitoring unit 202. The monitoring unit 202 may store the sensor data and feature information received from the sensor(s) 102 in the sensor data repository 204. The sensor data repository 204 may comprise a database, a cache, a filesystem, and/or other data storage means. The contents of the sensor data repository 204 may be stored for a short period of time, or may be archived for long-term storage, and may be accessed for processing the contents. In some implementations, the contents of the sensor data repository 204 may be purged after the contents are utilized to produce training data for the predictive algorithms used by the server 106 to generate prognosis information. The monitoring unit 202 may provide configuration information to the sensor(s) 102 from the prediction/classification unit 203.

The prediction/classification unit 203 may implement one or more predictive algorithms that may be used to analyze feature information associated with a monitored asset 101 extracted from the sensor data collected by the sensor(s) 102 associated with the monitored asset 101. The prediction/classification unit 203 may produce prognosis information indicating an occurrence of a condition of the monitored asset. The condition may, for example, be a situation where the monitored asset is in need of repair, maintenance, or other attention. The feature information produced from the sensor data may, for example, indicate that a characteristic associated with the monitored asset has fallen below or exceeded a threshold or has gone outside an expected range of values for the characteristic. The feature information may include information for more than one characteristic associated with the monitored asset. The prognosis information may, for example, indicate a malfunction of the monitored asset due to excessive vibrations being detected, a temperature associated with the monitored asset falling outside of an expected range, a loss of power, or a combination thereof. These examples illustrate some of the characteristics of a monitored asset that may be monitored and do not limit the techniques disclosed herein to these specific characteristics or combination of characteristics. The characteristics of a monitored asset may depend on the type of asset being monitored and the types of sensors that are being used to monitor the monitored asset. For example, a pump may have one or more sensors that monitor for vibrations and flow rate, while a computing device may include a temperature sensor that monitors a temperature of the device and a humidity sensor to monitor ambient humidity where the computing device is located.

The prediction/classification unit 203 may provide the prognosis information to the content provider 205. The content provider 205 may provide content to the user application 210 of the user device 107. The content provider 205 may be a web server, and the user application 210 may be a web browser application on the user device 107. The content provider 205 may push content, such as the prognosis information, to the user application 210, and the user application 210 may display an indication to the user of the user device 107 that the prognosis information has been received and the content of the prognosis information. In some implementations, the prediction/classification unit 203 may provide the prognosis information for a monitored asset to the work order management unit 206, and the work order management unit 206 may produce a work order to have a technician or other human user check the status of the monitored asset. The work order management unit 206 may send, to the user device 107, a work order or other request that identifies the monitored asset to be assessed by the technician or other user and includes the prognosis information that was produced by the prediction/classification unit 203 for the monitored asset. The user application 210 may display the work order and/or the prognosis information to the user. The user application 210 may also be configured to provide information for locating the monitored asset. For example, the information for locating the monitored asset may include coordinates of a location of the monitored asset, a photograph or diagram of the monitored asset or an example of the monitored asset, a map of a facility or geographic area in which the monitored asset is located, or a combination thereof. The user application 210 may display the prognosis information indicating an occurrence of a condition of the monitored asset. The user application 210 may display historical information regarding the past performance of the monitored asset and information regarding past maintenance and repairs that have been performed on the monitored asset. The historical information may be stored in the diagnostic information repository 212, which may be updated when a user provides diagnostic information in response to the prognosis information produced for a monitored asset, and in the repair and maintenance information repository 213, which may be updated when maintenance or repairs are performed on a monitored asset 101.

The user application 210 may provide a user interface in which the user may enter service information regarding the monitored asset. The service information may include diagnostic information, repair information, or both. The diagnostic information may include information indicative of whether the prognosis information produced by the prediction/classification unit 203 was correct. The repair information may include information indicative of repairs or maintenance performed on the monitored asset in response to the prognosis information. The repairs or maintenance performed may be suggested by the prediction/classification unit 203, or the user responding to the work order may determine which repairs or maintenance appear to be required by the monitored asset (if any). In some instances, the service information may include either diagnostic information or repair information. For example, in some instances a user may assess the status of the monitored assets and provide diagnostic information indicating whether the prognosis information appears to be correct without performing any repairs or maintenance on the monitored asset. In other instances, the user may perform repairs or maintenance on the monitored asset and provide repair information indicative of the actions that were taken on the monitored asset. In this latter example, the server 106 may treat the repair information as a tacit agreement that the diagnosis information was correct due to the repairs or maintenance performed on the monitored asset. The diagnostic information and the repair information may be structured to precisely indicate the current condition of the monitored asset 101 and exactly which repair or maintenance actions were taken by the user. The user interface may provide a checklist or other structured such structured interface that allows the user to select from list of options. The structured interface may present the user with a set of questions and a predetermined answer for each question from which the user may select responses. In some implementations, the user interface may include one or more unstructured inputs in which the user may provide text feedback. In some implementations, the service information may include images of the monitored asset to support the service information provided by the user.

The user interface of the user application 210 may provide an interface in which the user may provide diagnostic information confirming whether the prognosis information produced for the monitored asset was correct. In some instances, the prediction/classification unit 203 may produce prognosis information indicating an occurrence of a condition of the monitored asset that is incorrect or appears to be incorrect to the user that checks the status of the monitored asset. The user application 210 allows the user to provide diagnostic information including details of user's perceived operating status of the monitored asset. The diagnostic information may include information that indicates why the user believes that the prognosis information was incorrect in situations should the user believe that the prognosis information was incorrect. The diagnostic information entered via the user interface of the user application 210 may be provided to the data tagging unit 209, and the data tagging unit 209 may tag sensor data, feature information, or both, associated with the monitored asset.

The data tagging unit 209 is configured to tag or label feature information to produce training data that may be used by the learning unit 208 to train the predictive algorithms used by the prediction/classification unit 203. The data tagging unit 209 may obtain sensor data and/or feature information extracted from the sensor data from the sensor data repository 204. The data tagging unit 209 may also be configured to receive service information for monitored assets 101 that may include diagnostic information, repair information, or both. The work order management unit 206 may provide the service information received from the user device 107 to the data tagging unit 209. The data tagging unit 209 may also be provided with the prognosis information produced by the prediction/classification unit 203.

The data tagging unit 209 may tag feature information by associating the feature information with a label representing a possible condition of the monitored asset 101. The feature information included in the tagged feature information may include feature information that was used to produce the prognosis information. The feature information included in the tagged feature information may also include feature information that falls within a predetermined time period of the prognosis information being produced. The data tagging unit 209 is configured to tag the feature information with a label indicative of a condition of the monitored asset 101 that is believed to be correct. The service information provides empirical evidence of the condition of the monitored asset 101 as directly observed by the user that provided the service information. This empirical evidence, which may also be referred to as "ground truth," may be used to prove or disprove the inference(s) made by the prediction algorithms to generate the prognosis information. The data tagging unit 209 may associate the feature information with an indication of whether the feature information is or is not representative of a particular condition of the monitored asset 101. The predictive algorithms may be trained with this tagged feature information to refine the accuracy of the inferences that are made on untagged feature information in the future and may improve the prognosis information generated by the predictive algorithms in the future.

The data tagging unit 209 may include asset information with the tagged feature information. The asset information may include an asset type, asset parameters, sensor location(s) on the monitored asset 101, or a combination thereof. The asset type may provide context for the predictive algorithms for determining whether tagged feature information may be useful for a particular monitored asset. Some example asset types include but are not limited to "water pump" and "solar turbine." The asset type may be more specific and may include more specific details, such as a make or model number of the monitored asset 101. The asset parameters may include details regarding various aspects of the monitored asset 101 that may be useful for determining more refined prognosis information for the monitored asset 101. Some examples of the asset parameters may include but are not limited to a motor speed of a motor of the monitored asset 101 and a number of blades of a turbine of the monitored asset 101. The sensor location information may indicate where on the monitored asset 101 each sensor 102 is located. The location of the sensor 102 could impact the sensor data collected by the sensor 102 as well as the feature information derived from this sensor data. The sensor location information may be useful in determining where to place sensors 102 on the same type or a similar type of monitored asset 101 in the future. The example asset information provided herein illustrates concepts disclosed herein and is not limiting.

The label and the feature information may be added to the training data repository 207, which may be used by the learning unit 208 to refine the predictive algorithms used by the prediction/classification unit 203. The feature information associated with the label may be obtained from one or more of: (1) sensor data from sensors 102 associated with the monitored asset 101; (2) sensor data from sensors 102 associated with an environment in which the monitored asset 101 is operating (e.g., ambient temperature sensors, audio sensors, optical sensors, vibration sensors associated with a floor, wall, or piece of equipment in which the monitored equipment); and (3) sensor data from equipment dependent on the monitored asset 101 (e.g., downstream component experiences reduced flow rate from pump or itself overheats indicating that the pump (the monitored asset in this example) is experiencing a problem).

In some implementations, the sensor data repository 204 and the training data repository 207 may be implemented as a single repository. In such implementations, the data tagging unit 209 may move the tagged feature information from one repository to another or may instead update the repository to include associate feature information to be tagged with a label, and other information, such as but not limited to service information provided by the user and confidence level information for prognosis information, the service information, or both.

The learning unit 208 is configured to obtain the training data from the training data repository 207 to train the predictive algorithms used by the prediction/classification unit 203. The tagged feature information included in the training data includes labels for one or more possible conditions associated with monitored assets and examples of feature information aligned in time with the occurrence of or imminent occurrence of each of these conditions. The feature information included in the tagged feature information may include feature information that was used to produce the prognosis information. The feature information included in the tagged feature information may also include feature information that falls within a predetermined time period of the prognosis information being produced. As discussed above, the predictive algorithms may have a classification aspect and a predictive aspect. The classification aspect may make a determination whether feature information obtained for a monitored asset is indicative of one of a discrete number of possible conditions that the predictive algorithms have been trained to identify as having occurred or the occurrence of which is imminent. The predictive aspect may make a determination as to a likelihood of that an event related to the monitored asset 101. The prognosis information generated for the monitored asset may include information provided by the classification aspect, the predictive aspect, or both. The classification aspect of the predictive algorithms may use a classification model that distinguishes between various states or possible conditions in which a monitored asset may be operating (e.g., operating normally, specific component failure, etc.). The predictive algorithms may be used to analyze the untagged data using regression, classification, neural networks, deep learning, forms of machine learning, or other techniques, or a combination thereof to produce prognosis information for the monitored asset for which the untagged feature information was obtained. The predictive algorithms may use various learning methods, such as but not limited to logistic regression, naïve Bayes classifier(s), support vector machines (SVMs), decision tree learning algorithms, boosted trees learning algorithms, random forest learning algorithms, neural network(s), nearest neighbor algorithms.

The learning unit 208 be configured to use the training data to modify the classification variable(s), decision threshold(s), or both used by the predictive algorithms of the prediction/classification unit 203. The learning unit 208 may send the modified classification variable(s), decision threshold(s), or both to the sensor(s) 102 associated with the monitored asset. The sensor(s) 102 may use this information to change the operating parameters of the sensor(s) 102 and may cause the sensor 102 to add, remove, or modify features to be extracted from the sensor data obtained by the sensor 102. For example, if the sensor 102 is configured to monitor vibration of the monitored asset 101, some classification variables of interest may include but are not limited to the Root Mean Square Amplitude (RMS) of the vibration, the crest factor of the vibration, the shape factor of the vibration, the mean point of the vibration, the skewness of the vibration, the kurtosis of the vibration, and/or other such aspects of the vibration that may be computing in a time or frequency domain.

In an example implementation to illustrate these concepts, the prediction/classification unit 203 produces first prognosis information for the monitored asset 101 at a first time ($t_1$) which indicated that the monitored asset 101 appeared to be operating correctly, and the prediction/classification unit 203 produces second prognosis information for the monitored asset 101 at a second time ($t_2$). The second prognosis information is indicative of a condition of the monitored asset having occurred or is imminent. The data tagging unit 209 may obtain feature information stored in the sensor data repository 204 associated with the monitored asset for a period of time around the second time ($t_2$) (e.g., a predetermined amount of time before $t_2$, after $t_2$, or both) in which feature information indicative of the occurrence of the condition was likely to have been determined for the monitored asset 101. The data tagging unit 209 may associate the feature information with a label based on the service information that was obtained in response to the prognosis information. The service information may be used to confirm the occurrence of a possible condition of the monitored asset and the feature information may be associated with a label that represents that condition.

The data tagging unit 209 may also be configured to add confidence level information to the tagged feature information. As discussed in the preceding examples, the prediction/classification unit 203 may produce a confidence level for the prognosis information, and the work order management unit 206 may produce a confidence level in the service information provided by the user. The data tagging unit 209 may include one or both types of confidence information with the tagged feature information. The training of the predictive algorithms may use this confidence level information to further refine the predictive algorithms and to produce improved prognosis information indicative of an occurrence of a possible condition. For example, the training process of the predictive algorithms may assign a higher weight to tagged feature information having higher confidence levels than tagged feature information associated with lower or no confidence levels.

The data tagging unit 209 may manage different scenarios that may occur regarding the prognosis information and the service information, including but not limited to: (1) the service information indicates that the prognosis information was correct; (2) the service information indicates that the prognosis information was correct, but the repairs or maintenance performed on the monitored asset did not correct the condition of the monitored asset; and (3) the service information indicates that the prognosis information appears to be incorrect.

In the first scenario, the prognosis information may be provided to the user device 107. The user may physically assess the status of the monitored asset 101 to determine whether the prognosis information is correct. The user can determine whether the condition indicated in prognosis information has occurred or appears to be about to occur. The user may provide diagnostic information indicative of whether the prognosis information was correct. The user may provide repair information indicative of repairs or maintenance performed on the monitored asset 101 in response to the prognosis information. In some instances, the user does not provide diagnostic information but does provide repair information. In such instances, the data tagging unit 209 may treat the repair information as a tacit indication that the prognosis information was correct. The data tagging unit 209 may associate the diagnostic information, repair information, or both with the feature information. The association of feature information with information about the state of a monitored asset 101 (e.g. diagnostic information, repair information) thought to be true, is referred to herein as 'tagging.' The repair information may later be used to suggest repairs or maintenance in response to the prediction/classification unit 203 determining that the same condition has occurred with the same monitored asset or with a monitored asset of a similar type as the monitored asset for which the repairs or maintenance were originally performed.

In the second scenario discussed above, the user assesses the operation of the monitored asset 101 and provides feedback to the server 106 in the form of diagnostic information. In this scenario, the user performs repairs or maintenance on the monitored asset 101. The user provides repair information to the server 106 via the user application 210 of the user device 107. The term "repair information" is used herein to collectively refer to information associated with maintenance and repairs that the user has performed on the monitored asset.

Once the user has completed the repairs or maintenance on the monitored asset 101, the sensor(s) 102 associated with the monitored asset may continue to monitor the monitored asset 101 and to provide feature information to the server 106. The prediction/classification unit 203 of the server 106 can analyze the feature information and produce new prognosis information for the monitored asset 101. The data tagging unit 209 can be configured to determine whether the condition of the monitored asset 101 has been corrected based on the prognosis information. If the prognosis information indicates that the condition of the monitored asset 101 has not been corrected, the data tagging unit 209 may associate the diagnosis information with the feature information and may either (1) disregard or discount the repair information provided by the user when generating the tagged data, or (2) associate the repair information with the feature information and include an indication indicative of the repairs or maintenance having been performed having failed to resolve the condition of the monitored asset 101. The server 106 can use such an indication when providing suggested repairs or maintenance to a user in response to this condition occurring in the future. The suggested repair information may include a description past maintenance or repairs that were performed on the monitored asset or monitored assets of a similar type and whether these repairs or maintenance successfully resolved the condition of the monitored asset 101. This information may help a user determine what didn't work to fix a condition so that unnecessary repairs or maintenance can be avoided.

In the third scenario discussed above, the prognosis information appears to be incorrect. The user assesses the status of the monitored asset 101, and determines that the prognosis information appears to be incorrect. The user may send diagnostic information to the server 106 via the user application 210 of the user device 107 that indicates that the prognosis information produced by the prediction/classification unit 203 appears to be incorrect. The data tagging unit 209 may be configured disregard or discount the prognosis information responsive to the prognosis information being incorrect. For example, the data tagging unit 209 may not tag any feature information associated with the prognosis information for inclusion in the training data repository 207. The data tagging unit 209 may, alternatively, override the service information provided by the user. The prediction/classification unit 203 may produce a confidence level in the prognosis information and may also be configured to produce a confidence level in the service information provided by the user. The confidence level in the prognosis information may be based on historical data, stored for example in the diagnostic information repository 212, the repair and maintenance information repository 213, or both. The historical data may be used to indicate that the diagnosis of the condition of the monitored asset was correct in the past based on the same or similar feature information being assessed by the predictive algorithms used by the prediction/classification unit 203. The work order management unit 206 may produce a confidence level in the service information provided by the user in response to the prognosis information. The confidence level associated with the service information may be based on attributes of the user, such as but not limited to an experience level of the user, an amount of experience that the user has with the particular type of monitored asset, how often the user has correctly or incorrectly has diagnosed conditions related to this monitored asset or correctly or incorrectly diagnosed conditions related to other monitored assets, or other factors that may be relevant to the accuracy of the diagnosis provided by the user. The data tagging unit 209 may reject or ignore service information provided by the user that contradicts the prognosis information where the confidence level for the prognosis exceeds the confidence level for the service information provided by the user. In this scenario, the data tagging unit 209 may instruct the work order management unit 206 to request that the user reassess the status of the monitored asset 101 or that another user assess the status of the monitored asset 101. The data tagging unit 209 may instruct the work order management unit 206 to request that the user or another user perform repairs or maintenance that have been successful in the past for resolving the condition of the monitored asset 101. The server 106 may then monitor the status of the asset to determine whether the condition is subsequently resolved in response to the repairs or maintenance.

Figure 3:
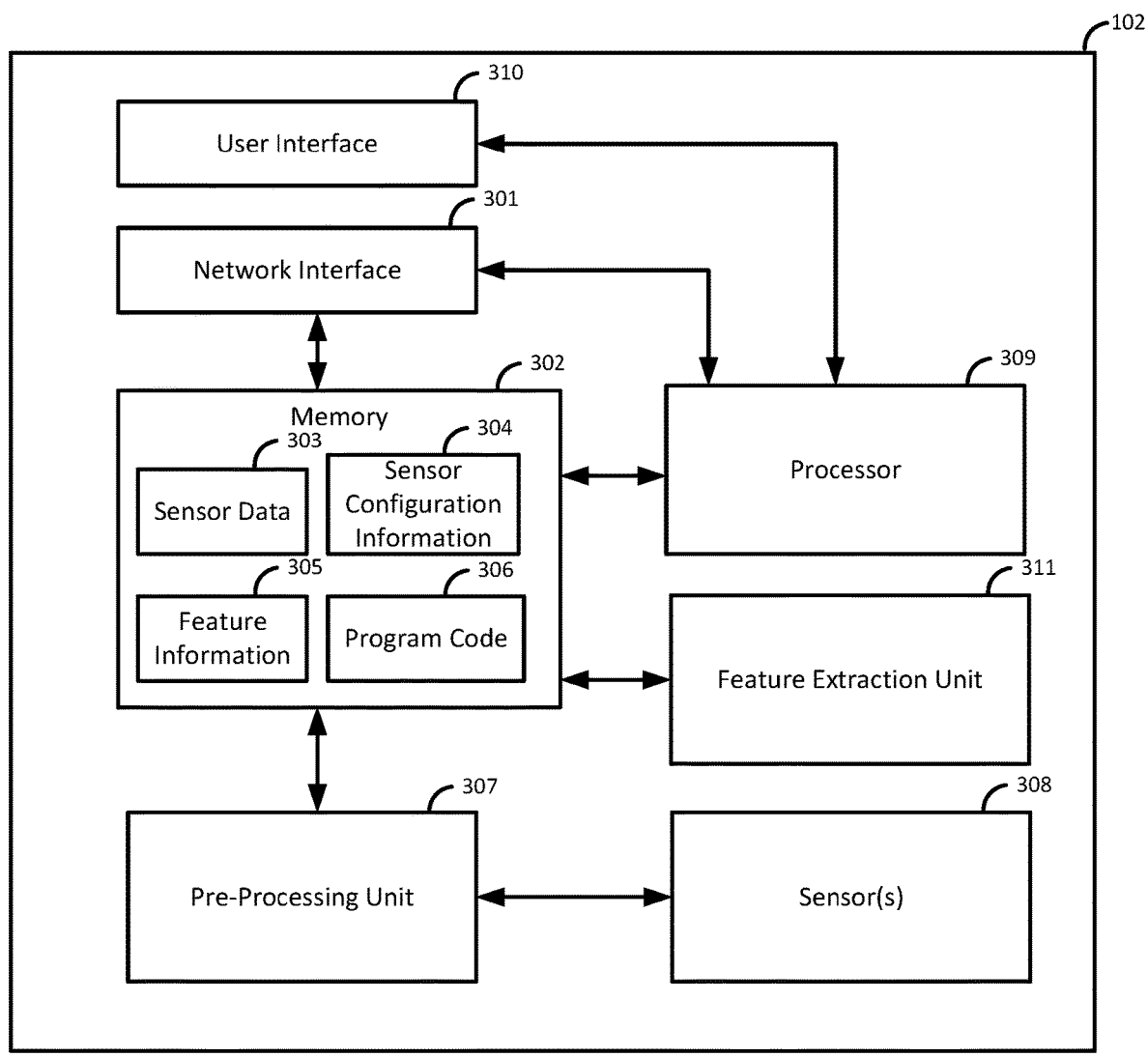
FIG. 3 is a block diagram of an example of a remote sensor shown in FIG. 1.

Referring to FIG. 3, an example of one of the sensors 102 shown in FIGS. 1 and 2 includes a network interface 301, a memory 302, a pre-processing unit 307, one or more sensors 308, a processor 309, and a user interface 310. The memory 302 may also include one or more of sensor data 303, sensor configuration information 304, feature information 305, and program code 306.

The sensor(s) 308 may sense one or more characteristics associated with a monitored asset and to produce sensor data. In some implementations, the sensor data may be stored in the memory as sensor data 303 after being output by the sensors. In some implementations, the pre-processing unit 307 may convert analog sensor data produced by the sensor(s) 308 into digital sensor data. The pre-processing unit 307 may store the digital sensor data as sensor data 303 in the memory 302. The pre-processing unit 307 may perform other processing on the sensor data 303 produced by the sensor(s) 308.

As shown, the sensor 102 may include a network interface 301 that may provide wired and/or wireless network connectivity to the sensor 102. The network interface 301 may include one or more local area network transceivers, one or more wide area network transceiver(s), or both that may be connected to one or more antennas. The one or more local area network transceivers comprise suitable devices, circuits, hardware, and/or software for communicating with and/or detecting signals to/from a wireless local area network (WLAN) wireless access point. In some implementations, the network device 104 may comprise a WLAN wireless access point, and the sensor 102 may use the WLAN transceivers to send data to and receive data from the network device 104. The wide area network transceiver(s) may comprise suitable devices, circuits, hardware, and/or software for communicating with and/or detecting signals from one or more wireless wide area network (WWAN) wireless base stations. The sensor 102 may include one or more wired network interface components that may enable the sensor 102 to communicate with the network 105 or the network device 104.

The sensor 102 may in some implementations comprise a user interface 310 that may allow a user to configure the sensor 102. The user interface 310 may comprise one or more buttons and/or a keypad for entering the sensor configuration information 304. The user interface 310 may include a display, such as liquid crystal display (LCD), a touchscreen, or other suitable display that may be used to display sensor configuration options and/or status to a user. The user interface 310 may also be configured to facilitate a user interacting with a computing device, such as user device 107, which may display a user interface on a touchscreen or other display of the computing device and include a keypad or other suitable means for receiving user inputs for entering the sensor configuration information 304.

The processor 309 may be communicably coupled with the network interface 301, the memory 302, the user interface 310, and other components of the sensor 102. The processor 309 may include one or more microprocessors, microcontrollers, and/or digital signal processors that provide processing functions, as well as other calculation and control functionality. In some implementations, the processor 309 may also implement the functionality of the pre-processing unit 307.

The processor 309 may be coupled to storage media (e.g., the memory 302) for storing data and software instructions for executing programmed functionality within the sensor 102. The memory 302 may be on-board the processor 309 (e.g., within the same integrated circuit (IC) package), and/or the memory may be external memory to the processor and functionally coupled over a data bus.

The feature extraction unit 311 of the sensor 102 may extract features from the sensor data to produce extracted feature information, and may select at least a subset of the extracted feature information using the feature extraction unit 311 to produce active feature information. The feature extraction unit 311 may perform feature extraction in which the sensor data obtained by the sensor(s) 308 is processed to analyze the sensor data to produce information that may be used by the predictive algorithms to discriminate between possible conditions of a monitored asset. The values of various features or combinations thereof may be indicative of the different possible conditions for which the predictive algorithms have been trained. The predictive algorithms used by the prediction/classification unit 203 of the server 106 may be trained by the learning unit 208 using feature information that has been "tagged" or labeled to indicate that a certain possible condition of the monitored asset 101 is present. The tagged data may include values for one or more of the features indicative of the occurrence of that condition. Once the algorithms have been trained by the learning unit 208, the predictive algorithms may be provided with untagged data. The predictive algorithms may be used to analyze the untagged data using regression, classification, other techniques, or a combination thereof to produce prognosis information for the monitored asset for which the untagged feature information was obtained. The prognosis information may indicate that a possible condition has occurred based on the analysis of the untagged feature information. Whether this prognosis information is correct may be verified by a technician or other user that may assess the condition of the monitored asset.

The feature extraction unit 311 may use various feature extraction techniques for extracting the feature information from the sensor data. The techniques disclosed herein do not require a specific feature extraction technique. The feature extraction unit 311 may be implemented in hardware instead of software or as a combination of hardware and software. The feature extraction unit 311 may be implemented one or more application specific integrated circuits (ASICs), programmable logic devices (PLDs), field programmable gate arrays (FPGAs), or other electronic units designed to perform the functions described herein, or a combination thereof. The feature extraction unit 311 may be implemented, at least in part, by processor executable program code.

The feature extraction unit 311 may determine a dynamic baseline value for each of the features that the feature extraction unit 311 extracts from the sensor data. The dynamic baseline value represents an expected value for each of the one or more features over time. The feature extraction unit 311 may develop the dynamic baseline over time based on observed sensor data for a monitored asset 101. In some implementations, the feature extraction unit 311 may be provided with default dynamic baseline information that may be used to provide an initial expected baseline values before the sensor 102 has had time to observe a sufficient amount of information to produce a dynamic baseline for a monitored asset. The default dynamic baseline information may be provided by the server 106, and may be based on attributes of the monitored asset, attributes of a plurality of similar monitored assets, expected environmental conditions at the location where the monitored asset is located, other factors that may influence one or more characteristic(s) of the monitored asset that may be monitored by the sensor(s) 308. These other factors may include changes in the characteristic(s) of the monitored asset 101 that are monitored by the sensor(s) 308 that occur over time due to normal wear and tear experienced by the monitored asset 101. The dynamic baseline determined by the feature extraction unit 311 for this feature may take into account these changes in the expected value of the feature extracted from the sensor data over time. The server 106 may provide information as to expected changes in the patterns of these characteristic(s) over time that have been generated by observing the operation of the same or similar type of monitored asset over time. The feature extraction unit 311 may use this information when determining the dynamic baseline for the monitored asset.

The feature extraction unit 311 may obtain sensor configuration information from the server 106 via the network interface 301. The sensor configuration information may include information for configuring various aspects of the operation of the sensor 102, such as but not limited to changing the set of feature information that the feature extraction unit 311 extracts from the sensor data, changing the set of active features for which the feature extraction unit 311 sends active feature information to the server 106, changing the rate at which sensor data is collected, changing the rate at which feature extraction is performed on the sensor data by the feature extraction unit 311, changing a rate at which the feature information is reported to the server 106 by the feature extraction unit 311.

In an illustrative implementation, the monitored asset 101 is a pump, and the sensor 102 includes sensor(s) 308 to collect the following sensor data: (1) flow rate from the pump and (2) vibration data from at least one point on the housing of the pump. The feature extraction unit 311 may analyze the sensor data to generate metrics that may be indicative of certain possible conditions that may occur with the pump. In this example, the feature extraction unit 311 may extract flow rate features, vibration data features, or a combination thereof from the sensor data that diverge from an expected baseline value, and report this information to the server 106 in active feature information. The dynamic baseline for the pump may include expected vibration patterns and flow rates for the pump that have been developed over time.

The server 106 receives the feature information from the sensor 102, and the prognosis/classification unit 203 of the server 106 may analyze this information using one or more predictive algorithms to determine whether a possible condition with the pump has occurred. For example, the predictive algorithms may have been trained for a "damaged impeller" condition which is characterized by vibration of the pump exceeding a predetermined threshold and a flow rate of the pump decreasing below a predetermined threshold. In response to the predictive algorithms generating prognosis information that indicates that the damaged impeller condition has occurred, a technician or other may be dispatched to assess the condition of the pump and may provide service information to the server 106 that includes diagnostic information, repair information, or both. In a situation where the service information supports the occurrence of the damaged impeller condition, the user may have noted that the impeller was suffering from an imbalance or from erosion. Alternatively, the service information may not support the occurrence of the damaged impeller condition and may instead indicate that the pump was suffering from bent shaft. In this scenario, the service information confirms that the pump was operating in a degraded state. The feature information collected around the time that the prognosis information was generated may be tagged with a first label indicative of the pump operating in a degraded state. The same set of feature information may also be tagged with a second label that indicates the specific condition that the pump experience (e.g. bent shaft or the damaged impeller). The predictive algorithms may be trained with the information for each of these scenarios in an attempt to identify feature information that may be used to discriminate between the occurrence of these two possible conditions. For example, a vibration pattern indicative of impeller damage may be different than a vibration pattern indicative of a bent shaft. The learning unit 208 may identify such a difference in the feature information obtained from the sensor(s) 102 associated with the pump, and to train the predictive algorithms so that the predictive algorithms may distinguish between these two conditions. The preceding example illustrates the concepts herein and does not limit the techniques disclosed herein this particular type of monitored asset or scenario.

Figure 4:
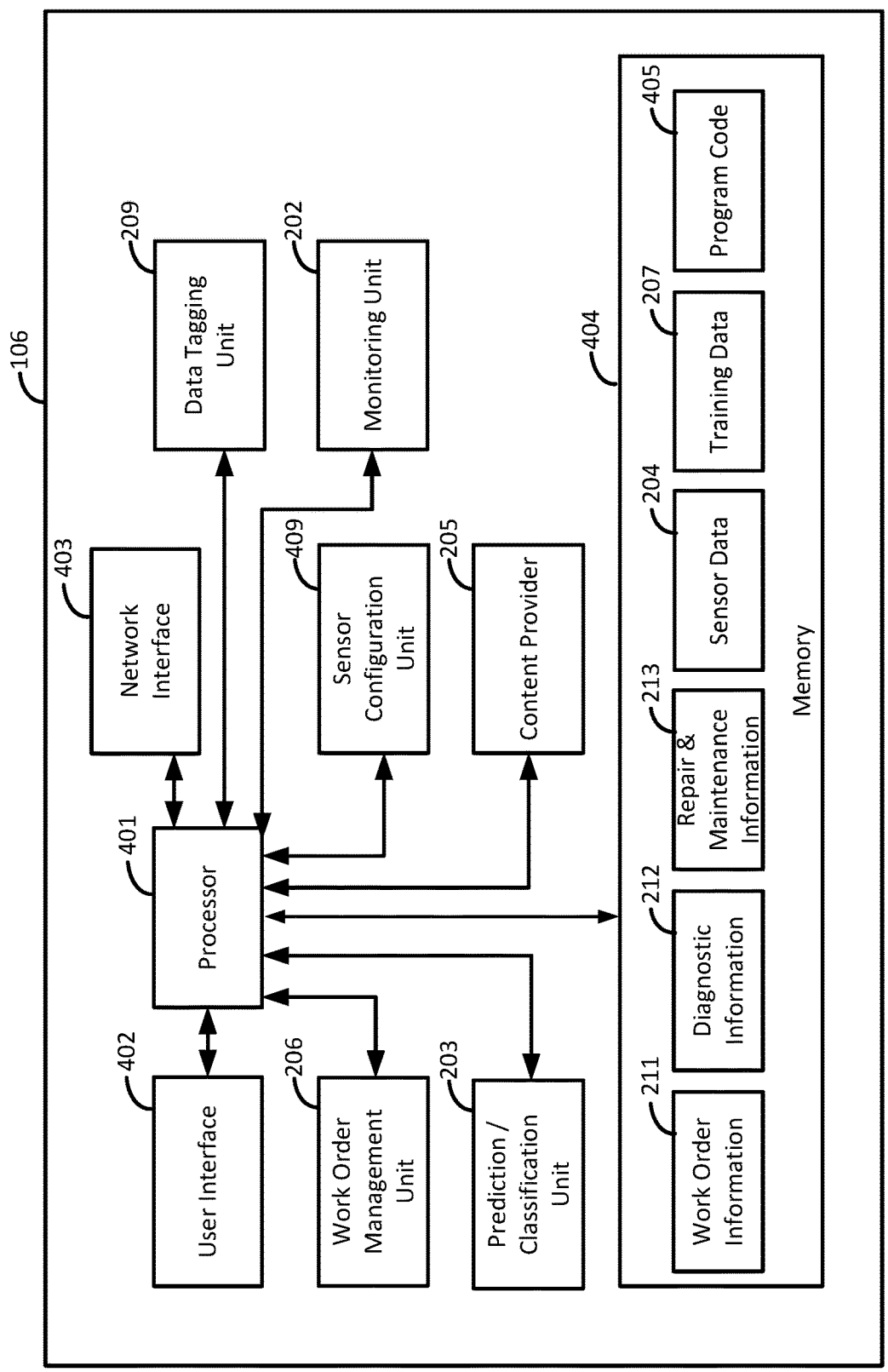
FIG. 4 is a block diagram of an example of a server shown in FIG. 1.

Referring to FIG. 4 is an example of the server 106 show in FIGS. 1 and 2. While FIG. 4 illustrates the server 106 as being implemented as a single device, the functionality of the server 106 may alternatively be implemented in multiple physical devices, virtual devices or some combination thereof. An example of the server 106 includes a processor 401, a user interface 402, a network interface 403, a memory 404. The server 106 may also include a monitoring unit 202, a prediction/classification unit 203, a content provider 205, a work order management unit 206, a data tagging unit 209, and a sensor configuration unit 409. The memory 404 may include the sensor data repository 204, training data repository 207, work order information repository 211, diagnostic information repository 212, and repair and maintenance information repository 213. The sensor data repository 204, training data repository 207, work order information repository 211, diagnostic information repository 212, and the repair and maintenance information repository 213 may comprise information used by the various component of the server 106 as described in the preceding examples.

The processor 401 may be communicably coupled with the user interface 402, the network interface 403, the memory 404, the monitoring unit 202, the prediction/classification unit 203, the content provider 205, the work order management unit 206, the data tagging unit 209, and the sensor configuration unit 409. The processor 401 may include one or more microprocessors, microcontrollers, and/or digital signal processors that provide processing functions, as well as other calculation and control functionality. The processor 401 may be coupled to storage media (e.g., the memory 404) for storing data and software instructions for executing programmed functionality within the server 106. The memory 404 may be on-board the processor 401 (e.g., within the same IC package), and/or the memory may be external memory to the processor and functionally coupled over a data bus. Furthermore, the memory 404 may comprise volatile memory, non-volatile memory, or a combination thereof. The memory 404 may include program code 405, which comprises processor-executable program code that may be executed by the processor 401.

The network interface 403 that may provide wired and/or wireless network connectivity to the server 106. The network interface 403 may include one or more local area network transceivers, one or more wide area network transceiver(s), or both that may be connected to one or more antennas. The one or more local area network transceivers comprise suitable devices, circuits, hardware, and/or software for communicating with and/or detecting signals to/from a wireless local area network (WLAN) wireless access point associated with the network 105 or with another network communicably coupled to the network 105. The wide area network transceiver(s) may comprise suitable devices, circuits, hardware, and/or software for communicating with and/or detecting signals from one or more wireless wide area network (WWAN) wireless base stations associated with the network 105 or with another network communicably coupled to the network 105. The server 106 may communicate with the sensor(s) 102 and the user device 107 via the network 105. The server 106 may include one or more wired network interface components that may enable the user device 107 to communicate with the server 106 and/or another networked device.

The user interface 402 may provide suitable interface systems for outputting audio and/visual content, and for facilitating user interaction with the server 106. For example, the user interface 402 may comprise one or more of a microphone and/or a speaker for outputting audio content and for receiving audio input, a keypad, a keyboard, and/or a touchscreen for receiving user inputs, and a display (which may be separate from the touchscreen or be the touchscreen) for displaying visual content.

The monitoring unit 202, the prediction/classification unit 203, the content provider 205, the work order management unit 206, and the data tagging unit 209 operate as discussed in the preceding examples. Furthermore, these units and the sensor configuration unit 409 may be implemented as processor-executable program code, hardware, or a combination thereof. The sensor configuration unit 409 may send sensor configuration information to the sensor(s) 102. The sensor configuration information may include information for configuration various aspects of the operation of the sensor 102, such as but not limited to changing the set of feature information that the sensor 102 extracts from the sensor data, changing the set of active features for which the sensor 102 sends active feature information to the server 106, the rate at which feature extraction is performed on the sensor data by the sensor 102, and a rate at which the feature information is reported to the server 106 by the sensor 102.

Figure 5:
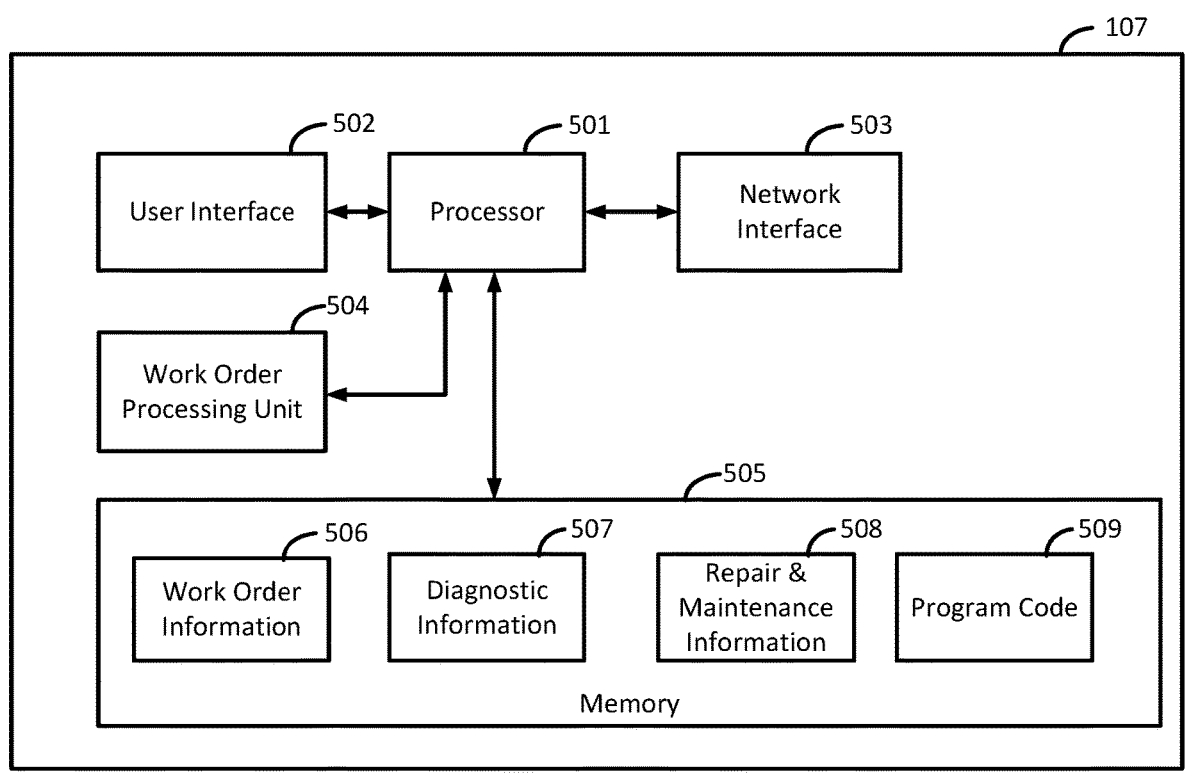
FIG. 5 is a block diagram of an example of a user device shown in FIG. 1.

Referring to FIG. 5, an example user device 107 shown in FIG. 2 includes a processor 501, a user interface 502, a network interface 503, a work order processing unit 504, and a memory 505. The memory 505 may store work order information 506, diagnostic information 507, repair information 508, and executable program code 509. The user device 107 may be a smartphone, a tablet computing device, laptop, or other portable computing device. The user device 107 may also be stationary or substantially stationary, such as a desktop computing device.

The processor 501 may be communicably coupled with the user interface 502, the network interface 503, the work order processing unit 504, and the memory 505. The processor 501 may include one or more microprocessors, microcontrollers, and/or digital signal processors that provide processing functions, as well as other calculation and control functionality. The processor 501 may be coupled to storage media (e.g., the memory 505) for storing data and software instructions for executing programmed functionality within the user device 107. The memory 505 may be on-board the processor 501 (e.g., within the same IC package), and/or the memory may be external memory to the processor and functionally coupled over a data bus. Furthermore, the memory 505 may comprise volatile memory, non-volatile memory, or a combination thereof.

The user device 107 may include a network interface 503 that may provide wired and/or wireless network connectivity to the user device 107. The network interface 503 may include one or more local area network transceivers, one or more wide area network transceiver(s), or both that may be connected to one or more antennas. The one or more local area network transceivers comprise suitable devices, circuits, hardware, and/or software for communicating with and/or detecting signals to/from a wireless local area network (WLAN) wireless access point associated with the network 105 or with another network device communicably coupled to the network 105. The wide area network transceiver(s) may comprise suitable devices, circuits, hardware, and/or software for communicating with and/or detecting signals from one or more wireless wide area network (WWAN) wireless base stations associated with the network 105 or with another network communicably coupled to the network 105. The user device 107 may communicate with the server 106 via the network 105. The user device 107 may include one or more wired network interface components that may enable the user device 107 to communicate with the server 106 and/or another networked device.

The user interface 502 provides suitable interface systems for outputting audio and/visual content, and for facilitating user interaction with the user device 107. For example, the user interface 502 may include one or more of a microphone and/or a speaker for outputting audio content and for receiving audio input, a keypad and/or a touchscreen for receiving user inputs, and a display (which may be separate from the touchscreen or be the touchscreen) for displaying visual content.

The work order processing unit 504 may implement the user application 210 discussed with respect to FIG. 2. The work order processing unit 504 may be implemented in processor-executable program code (e.g., executable program code 509), hardware, or a combination thereof. The work order processing unit 504 may receive a work order from the server 106. The work order may include prognosis information for a monitored asset 101 and other information, such as location information for the monitored asset that may assist the user in locating the monitored asset. The work order processing unit 504 may provide a user interface for displaying the work order information, prognosis information, and location information for the monitored asset 101. The user interface may also be configured to display repair and maintenance history information for the monitored asset (where available), and the user interface may also include recommended repairs or maintenance for the monitored asset based on the repair and maintenance history of the monitored asset, the repair and maintenance history for monitored assets of a similar type, or both. The user interface may also allow the user to enter service information, which may include diagnostic information 507, repair information 508, or both as discussed in the preceding examples. The work order processing unit 504 may send the service information to the server 106 using the network interface 503.

Figure 6:
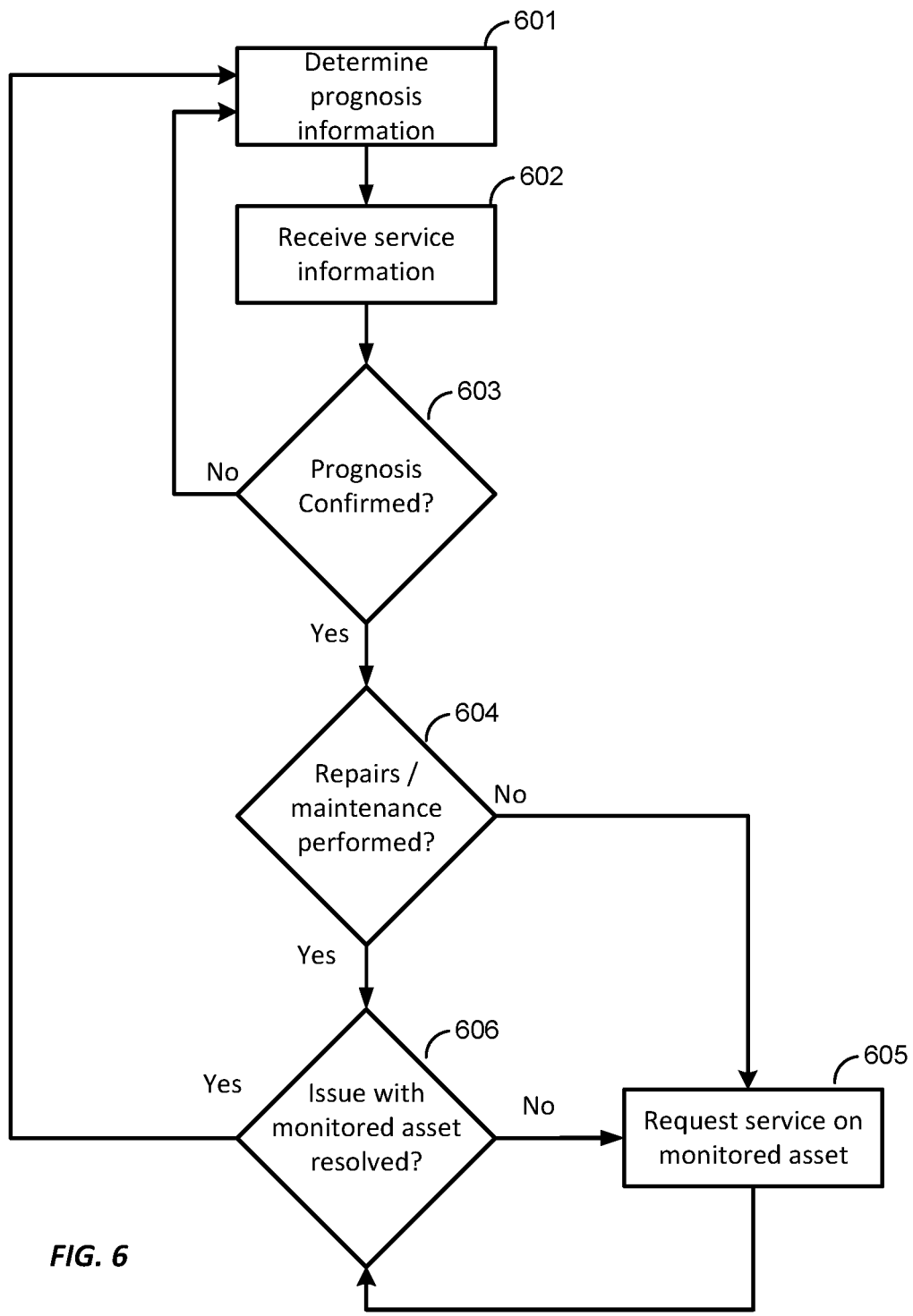
FIG. 6 is a flow diagram of an example process for monitoring an asset and for generating a prognosis for the monitored asset.

FIG. 6 is a flow diagram of an example process for monitoring a monitored asset and for generating a prognosis for the monitored asset according to the disclosure. The process illustrated in FIG. 6 may be performed by the server 106 of the monitoring system illustrated in the preceding figures. The process illustrated in FIG. 6 is an example only and is not limiting. The example process may be altered, e.g. by having stages added, removed, rearranged, combined, performed concurrently, by having single stages split into multiple stages, or a combination thereof.

The server 106 may determine prognosis information a monitored asset 101 (stage 601). The prediction/classification unit 203 of the server 106 may receive feature information from one or more sensor(s) 102 associated with the monitored asset 101. The prediction/classification unit 203 may produce the prognosis information by applying one or more predictive algorithms to the feature information. The predictive algorithms may be trained using tagged feature information. Tagged feature information may include a label associated with a possible condition that had occurred with a monitored asset 101 and feature information based upon sensor data collected at the time of the occurrence of that condition. The predictive algorithms may be trained with tagged feature information for multiple conditions. Once the predictive algorithms have been trained, untagged feature information collected from the sensor(s) 102 associated with the monitored asset 101 may then be provided to the prediction/classification unit 203 in order to generate prognosis information for the monitored asset 101. The predictive algorithms may be trained using tagged feature information, such as training data in the training data repository 207, prior to the deployment of the sensor on the monitored asset. Additionally, the predictive algorithm may be trained using tagged feature information including updates to the tagged feature information determined following the deployment the monitoring system or deployment of the sensor on the monitored asset.

The prediction/classification unit 203 may output the prognosis information, and the content provider 205 and/or the work order management unit 206 may provide the prognosis information to the user device 107. The monitoring system may be associated with a plurality of user devices, and each device may be associated with a user that the monitoring system may request make an assessment whether the prognosis information for the monitored asset is correct. The work order management unit 206 may select a user from the plurality of users based on user availability, proximity to the monitored asset, user experience with the monitored asset or similar types of assets, other factors that may be used to select a user from the plurality of users, or combination thereof. The work order management unit 206 may send a work order to the user via the user device 107 that includes at least the prognosis information and information identifying the monitored asset. Other information, such as map of the environment in which the monitored location is located, proposed repairs or maintenance information, and historical information for the monitored asset may also be provided to the user device 107 in addition to the work order.

Service information may be received from a user in response to the prognosis information (stage 602). The service information may include diagnostic information, repair information, or both. The diagnostic information includes information indicative of whether the prognosis information was correct, and the repair information includes information indicative of repairs or maintenance performed on the monitored asset in response to the prognosis information. The user may provide the service information via the user application 210 of the user device 107.

A determination may be made whether the service information confirms the prognosis information (stage 603). If the service information indicates that the prognosis information was incorrect, the process may return to stage 601 where new prognosis information may be determined for the monitored asset. In some implementations, the prediction/classification unit 203 may produce a confidence level for the prognosis information. The confidence level may be used to determine whether to disregard or discount diagnostic information provided by the user that asserts that the prognosis information is incorrect. In some implementations, if the confidence level in the prognosis exceeds a confidence level threshold, the service information obtained from the user may be disregarded or discounted and the process may continue with stage 604. The data tagging unit 209 may not include the service information provided by the user with the tagged feature information in this situation. In other implementations, both the prognosis information and the diagnostic information may be associated with a respective confidence level. If the confidence level associated with the prognosis information is higher than the confidence level associated with the diagnostic information, the process may continue with stage 604. Otherwise, the process may return to stage 601 where new prognosis information may be determined.

Where the prognosis information is determined to be incorrect, and the process returns to stage 601, the server 106 may generate tagged feature information that may be used to train the predictive algorithms used to generate the prognosis information. The data tagging unit 209 may tag the feature information associated with the prognosis information to include an indication that the feature information is not indicative of the possible condition of the monitored asset 101 identified in the prognosis information. Such feature information may be used to train the predictive algorithms as to feature information that is not indicative of the occurrence of a particular possible condition and may be used to refine the predictive algorithms.

The server 106 may make a determination whether a user made repairs or maintenance on the monitored asset 101 (stage 604). If the user made repairs or performed maintenance on the monitored asset 101, the process may continue with stage 606. As discussed in the preceding examples, the user may provide service information, which may include diagnostic information indicative of whether the prognosis information was correct, and repair information that indicates whether the user performed repairs or maintenance on the monitored asset.

If the user made no repairs or performed no maintenance on the monitored asset 101, the process may continue to stage 605, wherein the server 106 may request service on the monitored asset. The work order management unit 206 may produce a work order for a user to assess the monitored asset again and to perform maintenance or repairs on the asset since the prognosis information produced by the server 106 was confirmed to be correct in stage 603. However, no action was taken by the user at that time to resolve the condition of the monitored asset 101.

A determination may be made whether the condition of the monitored asset has been resolved (stage 606). The user that responded to the request to perform service on the monitored asset 101 in stage 605 may have provided repair information to the server 106 via the user application 210 of the user device 107. The monitoring unit 202 of the server 106 may collect additional sensor data and/or feature information from the sensor(s) 102 associated with the monitored asset 101. The monitoring unit 202 may extract feature information from the sensor data in response to additional sensor data being obtained from the sensor(s) 102 associated with the monitored asset. The prediction/classification unit 203 may analyze the additional feature information to produce new prognosis information for the monitored asset 101.

If the new prognosis information is indicative of the condition of the monitored asset 101 having been resolved, the process may return to stage 601. Before returning to stage 601, the data tagging unit 209 of the server 106 may tag the feature information as discussed in the preceding examples. The data tagging unit 209 may include service information provided by the user with the tagged feature information. The data tagging unit 209 may also include confidence level information for the prognosis information, the service information, or both in the tagged feature information.

Otherwise if the new prognosis information is not indicative of the condition of the monitored asset having been resolved, the process may return to stage 605 where a request for service on the monitored asset 101 may be made. The user may assess the current state of the monitored asset 101 and determine whether additional repairs or maintenance on the monitored asset 101 may be necessary. The data tagging unit 209 may tag the feature information associated with the prognosis information to include an indication that the feature information is not indicative of the possible condition of the monitored asset 101 identified in the prognosis information. Such feature information may be used to train the predictive algorithms as to feature information that is not indicative of the occurrence of a particular possible condition and may be used to refine the predictive algorithms.

FIG. 7 is a flow diagram of an example process for monitoring a monitored asset and for generating a prognosis for the monitored asset according to the disclosure. The server 106 provides the means for implementing the process illustrated in FIG. 7. The process illustrated in FIG. 7 is an example only and is not limiting. The example process may be altered, e.g. by having stages added, removed, rearranged, combined, performed concurrently, by having single stages split into multiple stages, or a combination thereof.

Feature information associated with sensor data associated with a monitored asset may be obtained (stage 701). The monitoring unit 202 of the server 106 may obtain feature information from one more sensors 102 configured to sense one or more characteristics associated with a monitored asset to produce sensor data, and to extract feature information from the sensor data. The monitoring unit 202 may provide the feature information obtained from the sensor(s) to the prediction/classification unit 203 of the server 106.

The feature information may be analyzed using a predictive algorithm to produce prognosis information (stage 702). The prediction/classification unit 203 may analyze the feature information using one or more predictive algorithms to produce prognosis information for the monitored asset. The prognosis information is indicative of an occurrence of a condition of the monitored asset. The predictive algorithms may be trained using tagged data that associates a label for a particular possible condition with feature information that is indicative of an occurrence of that condition. The types of conditions that may be included in the training data, and the types of features associated with each condition dependent on the type of monitored assets for which the predictive algorithms have been trained.

Service information may be received from a user in response to the prognosis information (stage 703). As discussed in the preceding examples, the prognosis information produced by the server 106 may be provided to a user who may assess the status of the monitored asset and make a determination whether the prognosis information was correct. The prognosis information may be sent to the user device 107, and the user application 210 may present to the prognosis information, historical service information associated with the monitored asset, proposed repairs or maintenance. The user may provide service information via the user application 210 that may include diagnostic information, repair information, or both.

A confidence level may be determined for the service information (stage 704). The work order management unit 206 may produce a confidence level in the service information provided by the user in response to the prognosis information. The confidence level associated with the service information may be based on attributes of the user, such as but not limited to an experience level of the user, an amount of experience that the user has with the particular type of monitored asset, how often the user has correctly or incorrectly has diagnosed conditions related to this monitored asset or correctly or incorrectly diagnosed conditions related to other monitored assets, or other factors that may be relevant to the accuracy of the diagnosis provided by the user.

The feature information may be tagged with the service information based at least in part on the confidence level (stage 705). As discussed in the preceding examples, data tagging unit 209 may include the service information in the tagged feature information, unless the confidence level indicates that the service information is too unreliable to be utilized. The data tagging unit 209 may disregard or discount service information provided by the user that contradicts the prognosis information where the confidence level for the prognosis exceeds the confidence level for the service information provided by the user. The data tagging unit 209 may disregard or discount the service information if the confidence level for the service information falls below a predetermined threshold. The data tagging unit 209 may disregard or discount the service information by not including the service information in the tagged feature information. The data tagging unit 209 may include the confidence level information in the tagged feature information along with the service data.

The predictive algorithm may be trained based on tagged feature information (stage 706). The data tagging unit 209 of the server 106 may tag the feature information used to produce the prognosis information in response to the service information indicating that the prognosis information was correct. The tagged feature information may be used to refine the training of the prediction algorithms used by the prediction/classification unit 203 of the server 106. An example process for tagging data is illustrated in FIG. 8.

FIG. 8 is a diagram of an example of an additional stage that may be used to implement an additional stage of the process illustrated in FIG. 7. The server 106 provides the means for implementing the additional stage illustrated in FIG. 8. The example illustrated in FIG. 8 is an example only and is not limiting.

The feature information used to produce the prognosis information may be tagged with a label associated with a possible condition, in response to and based upon the service information indicating that the prognosis information was correct (stage 801). The data tagging unit 209 may tag or label data to produce training data that may be used by the learning unit 208 to train the predictive algorithms used by the prediction/classification unit 203. The data tagging unit 209 may obtain feature information extracted from the sensor data from the sensor data repository 204. The data tagging unit 209 may obtain feature information stored in the sensor data repository 204 associated with the monitored asset for a period of time around which feature information indicative of the occurrence of the condition were likely to have been determined for the monitored asset 101, as discussed above. The data tagging unit 209 may also receive service information for monitored assets that may include diagnostic information, repair information, or both. The learning unit 208 may obtain the tagged feature information from the training data repository 207 and train the predictive algorithms used by the prediction/classification unit 203. The tagged feature information may be used to refine the predictive algorithms as discussed in the preceding examples.

Figure 9:
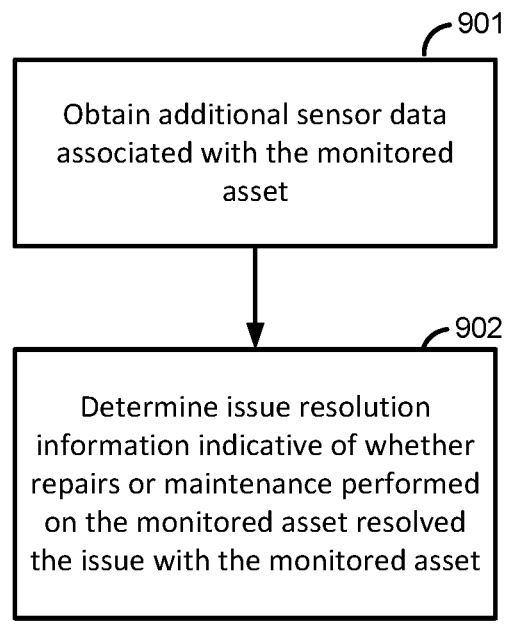
FIG. 9 is a flow diagram of an example process for determining issue resolution information.

FIG. 9 is a flow diagram of an example process for determining condition resolution information according to the disclosure. The process illustrated in FIG. 9 may be used to implement additional stages of the process illustrated in FIG. 7. The server 106 provides the means for implementing the process illustrated in FIG. 9. The process illustrated in FIG. 9 is an example only and is not limiting. The example process may be altered, e.g. by having stages added, removed, rearranged, combined, performed concurrently, by having single stages split into multiple stages, or a combination thereof.

Additional sensor data associated with the monitored asset may be obtained (stage 901). The monitoring unit 202 of the server 106 may obtain additional feature information from one more sensor 102 configured to sense one or more characteristics associated with the monitored asset to produce additional sensor data, and to extract the additional feature information from the additional sensor data. The monitoring unit 202 may provide the additional feature information obtained from the sensor(s) to the prediction/classification unit 203 of the server 106.

Condition resolution information may be determined (stage 902). The condition resolution information may indicate whether repairs or maintenance performed on the monitored asset resolved the condition of the monitored asset. The prediction/classification unit 203 may produce additional prognosis information for the monitored asset by analyzing the additional feature information produced in stage 901. The prediction/classification unit 203 may determine whether the prognosis information produced based on the additional feature information indicates that the condition of the monitored asset 101 has been resolved. If the condition has not been resolved, the prediction/classification unit 203 may provide the prognosis information to the work order management unit 206. The work order management unit 206 may select a technician or other user to assess the status of the monitored asset 101, and to make repairs or maintain the monitored asset 101. If the condition has been resolved, the data tagging unit 209 may tag the feature information associated in time with the original or prior prognosis information to indicate that the original or prior prognosis information was correct and that repairs or maintenance that were performed on the monitored asset 101 corrected the condition of the monitored asset 101.

Figure 10:
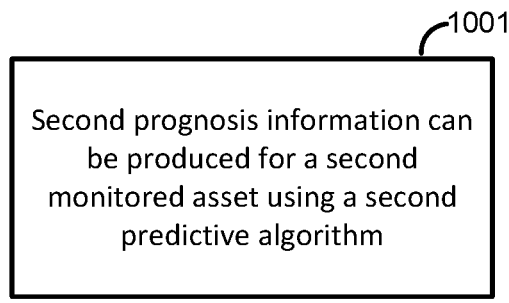
FIG. 10 is a diagram of an example of an additional stage that may be used to implement an additional stage of the process illustrated in FIG. 7.

FIG. 10 is a diagram of an example of an additional stage that may be used to implement an additional stage of the process illustrated in FIG. 7. The server 106 provides the means for implementing the example illustrated in FIG. 10. The example illustrated in FIG. 10 is an example only and is not limiting.

Second prognosis information may be produced for a second monitored asset using a second predictive algorithm (stage 1001). The second predictive algorithm may use the training data associated with the first monitored asset. The second monitored asset may be a same or similar type of assets as the first monitored asset. The prediction/classification unit 203 of the server 106 may be trained using tagged data from a first monitored asset to produce prognosis information for a second monitored asset of a same or similar type as the first monitored asset. The predictive algorithms may be trained using tagged data from a plurality of assets. These assets may be of a same type (e.g., a specific make and model of pump) or a similar type (e.g. a similar class of pump). Training the predictive algorithms with a diverse data set may help to refine the predictive algorithms to provide better prognosis results. Similarly, the predictive algorithms may be trained with data obtained from a single monitored asset 101 may be used to train the predictive algorithms to analyze feature information and produce prognosis information for other similar monitored assets 101. A single predictive algorithm may be trained using training data associated with more than one monitored asset. Alternatively, more than one predictive algorithm may be trained. Each predictive algorithm may use the training data associated with one or more of the assets being monitored.

Figure 11:
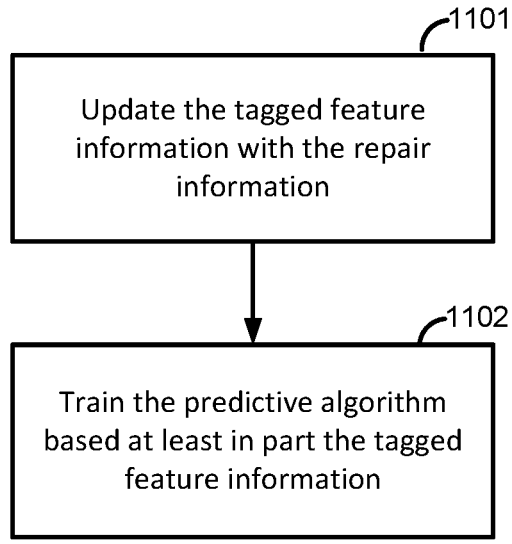
FIG. 11 is a flow diagram of an example process for training a predictive algorithm with feature information tagged with repair information.

FIG. 11 is a flow diagram of an example process for training a predictive algorithm with feature information tagged with repair information according to the disclosure. The process illustrated in FIG. 11 may be used to implement additional stages of the process illustrated in FIG. 9. The server 106 provides the means for implementing the process illustrated in FIG. 11. The process illustrated in FIG. 11 is an example only and is not limiting. The example process may be altered, e.g. by having stages added, removed, rearranged, combined, performed concurrently, by having single stages split into multiple stages, or a combination thereof.

The tagged feature information may be updated with the repair information (stage 1101). The service information provided by the user via the user application 210 of the user device may include repair information indicative of repairs or maintenance that the user performed on the monitored asset. In the process illustrated in FIG. 11, the condition resolution information indicates that the repairs or maintenance performed on the monitored asset 101 by the user appear to have successfully resolved the condition of the monitored asset 101. The feature information, associated in time with the prior prognosis information, may be tagged with the repair information and an indication that the repairs successfully addressed the condition of the monitored asset 101. The data tagging unit 209 may store the tagged feature information in the training data repository 207.

The predictive algorithms may be trained based at least in part on the tagged feature information (stage 1102). The learning unit 208 may obtain the tagged feature information from the training data repository 207 and train the predictive algorithms used by the prediction/classification unit 203. The tagged feature information may be used to refine the predictive algorithms.

Figure 12:
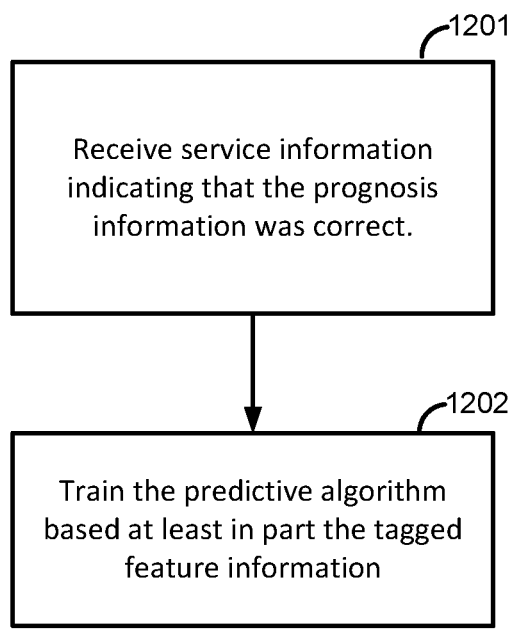
FIG. 12 is a flow diagram of an example process for training a predictive algorithm with feature information tagged with repair information.

FIG. 12 is a flow diagram of an example process for training a predictive algorithm with feature information tagged with repair information according to the disclosure. The process illustrated in FIG. 12 may be used to implement additional stages of the process illustrated in FIG. 9. The server 106 provides the means for implementing the process illustrated in FIG. 12. The process illustrated in FIG. 12 is an example only and is not limiting. The example process may be altered, e.g. by having stages added, removed, rearranged, combined, performed concurrently, by having single stages split into multiple stages, or a combination thereof.

The tagged feature information may be updated with the repair information and an indication that the repairs or maintenance performed on the monitored asset has not resolved the condition (stage 1201). The data tagging unit 209 may add the repair information to the tagged feature information that is added to the training data repository 207. In the process illustrated in FIG. 12, the condition resolution information indicates that the repairs or maintenance performed on the monitored asset 101 by the user appear not to have resolved the condition of the monitored asset 101. The tagged feature information may be updated to include the repair information and an indication that the repairs failed to address the condition of the monitored asset 101. The data tagging unit 209 may store the tagged feature information in the training data repository 207.

The predictive algorithms may be trained based as least in part on the tagged feature information (stage 1202). The learning unit 208 may obtain the tagged feature information from the training data repository 207 and train the predictive algorithms used by the prediction/classification unit 203. The tagged feature information may be used to refine the predictive algorithms.

Figure 13:
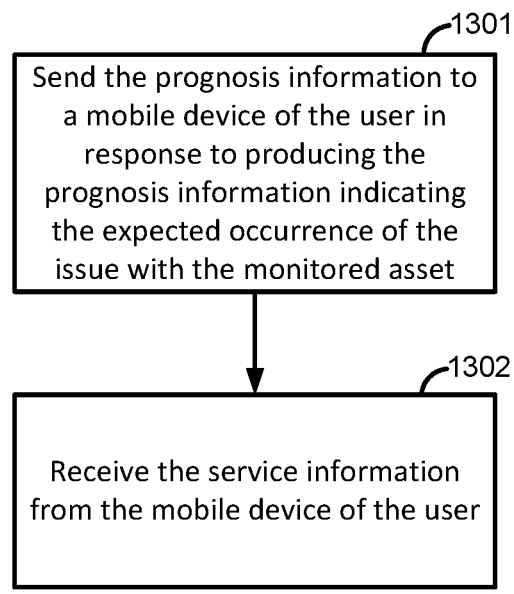
FIG. 13 is a flow diagram of an example process for obtaining service information for a monitored asset.

FIG. 13 is a flow diagram of an example process for obtaining service information for a monitored asset according to the disclosure. The process illustrated in FIG. 13 may be used to implement additional stages of the process illustrated in FIG. 7. The server 106 provides the means for implementing the process illustrated in FIG. 13. The process illustrated in FIG. 13 is an example only and is not limiting. The example process may be altered, e.g. by having stages added, removed, rearranged, combined, performed concurrently, by having single stages split into multiple stages, or a combination thereof.

The prognosis information may be sent to a mobile device of a user (stage 1301). As discussed in the preceding examples, the prediction/classification unit 203 may provide the prognosis information the content provider 205 and/or the work order management unit 206. The prognosis information may be displayed to a user of the user device 107. The prognosis information may be displayed with a work order requesting that the user assess the status of the monitored asset 101. The user may also be provided with additional information, such as information to assist in locating the monitored asset 101. Historical information for the monitored asset 101 may also be provided that includes past maintenance and repairs that have been performed on the monitored asset 101. Information that includes proposed repairs or maintenance may also be included with the prognosis information provided to the user.

Service information may be received in response to sending the prognosis information (stage 1302). The user may provide service information to the server 106 via the user device 107. The service information may include diagnostic information, repair information, or both. The diagnostic information may include information indicative of whether the prognosis information produced by the server 106 for the monitored asset was correct. The repair information may comprise information indicative of repairs or maintenance performed on the monitored asset in response to the prognosis information.

Figure 14:
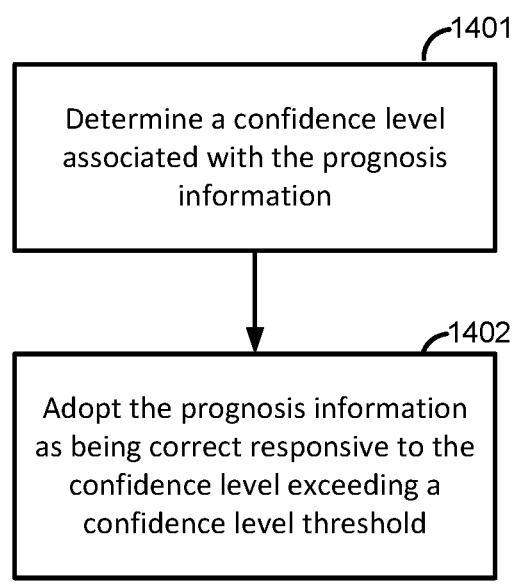
FIG. 14 is a flow diagram of an example process for associating a confidence level with the prognosis information according to the disclosure.

FIG. 14 is a flow diagram of an example process for associating a confidence level with the prognosis information according to the disclosure. The process illustrated in FIG. 14 may be used to implement additional stages of the process illustrated in FIG. 7. The server 106 provides the means for implementing the process illustrated in FIG. 14. The process illustrated in FIG. 14 is an example only and is not limiting. The example process may be altered, e.g. by having stages added, removed, rearranged, combined, performed concurrently, by having single stages split into multiple stages, or a combination thereof.

A confidence level associated with the prognosis information may be determined (stage 1401). As discussed in the preceding examples, the prediction/classification unit 203 may produce a confidence level for the prognosis information and a confidence level for the service information provided by the user. The confidence level in the prognosis information may be based on historical data, stored for example in the diagnostic information repository 212, the repair and maintenance information repository 213, or both, which may be used to indicate that the diagnosis of the condition of the monitored asset was correct in the past based on the same or similar feature information being assessed by the predictive algorithms used by the prediction/classification unit 203.

The prognosis information may be adopted responsive to the confidence level exceeding a confidence level threshold (stage 1402). The user may provide service information, including diagnostic information, repair information, or both, that may indicate that the prognosis information produced by the prediction/classification unit 203 does not appear to be correct. However, the data tagging unit 209 may disregard or discount service information provided by the user that contradicts the prognosis information where the confidence level for the prognosis exceeds the confidence level for the service information provided by the user. The confidence level associated with the service information may be based on attributes of the user, such as but not limited to an experience level of the user, an amount of experience that the user has with the particular type of monitored asset, how often the user has correctly or incorrectly has diagnosed conditions related to this monitored asset or correctly or incorrectly diagnosed conditions related to other monitored assets, or other factors that may be relevant to the accuracy of the diagnosis provided by the user.

The data tagging unit 209 may also be configured to send a command to the work order management unit 206 to cause the work order management unit 206 to request that the user or another user reassess the status of the monitored asset 101. The work order management unit 206 may request that the user or another user perform repairs or maintenance that have been successful in the past for resolving the condition of the monitored asset 101. The server 106 may then monitor the status of the asset to determine whether the condition is subsequently resolved in response to the repairs.

Figure 15:
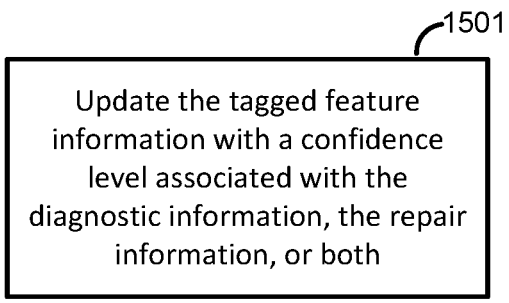
FIG. 15 is a diagram of an example of an additional stage that may be used to implement an additional stage of the process illustrated in FIG. 14.

FIG. 15 is a diagram of an example of an additional stage that may be used to implement an additional stage of the process illustrated in FIG. 14. The server 106 provides the means for implementing the process illustrated in FIG. 15. The example illustrated in FIG. 15 is an example only and is not limiting.

The tagged feature information may be updated with a confidence level associated with the diagnostic information, the repair information, or both (stage 1501). The service information provided by the user that assesses the condition of the monitored asset 101 in response to the prognosis information may be assigned a confidence level by the work order management unit 206 as discussed above. The data tagging unit 209 may receive the confidence level information from the work order management unit 206 with the service information provided by the user. The data tagging unit 209 may include the confidence level information with the tagged feature information that is added to the training data repository 207.

Figure 16:
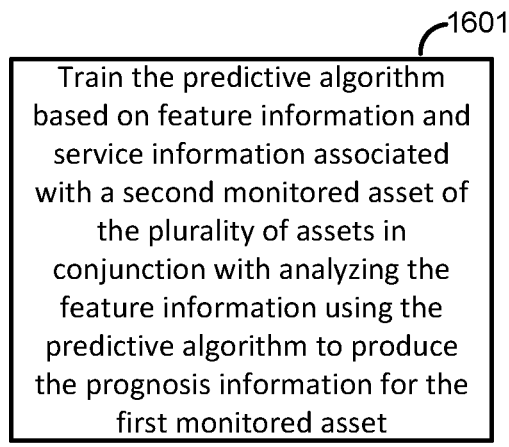
FIG. 16 is a diagram of an example of an additional stage that may be used to implement, at least in part, stage 704 of the process illustrated in FIG. 7.

FIG. 16 is a diagram of an example of an additional stage that may be used to implement, at least in part, stage 704 of the process illustrated in FIG. 7. In the example illustrated in FIG. 16, data from a plurality of monitored assets may be obtained and used to train the predictive algorithms used by the prediction/classification unit 203. The plurality of monitored assets may include more than one monitored asset of a same or similar type. Including data from multiple assets of the same or similar type may help refine the predictive algorithms by providing a richer data set. The server 106 provides the means for implementing the process illustrated in FIG. 16. The example stage illustrated in FIG. 16 is an example only and is not limiting.

The predictive algorithm may be trained based on feature information and service information associated with a second monitored asset of a plurality of assets in conjunction with producing the prognosis information for the first monitored asset (stage 1601). The data tagging unit 209 may tag data from a plurality of monitored assets and to add the tagged features to the training data repository 207. The learning unit 208 may obtain the tagged feature information from the training data repository 207 and train the predictive algorithms used by the prediction/classification unit 203. The tagged feature information may be used to refine the predictive algorithms.

Figure 17:
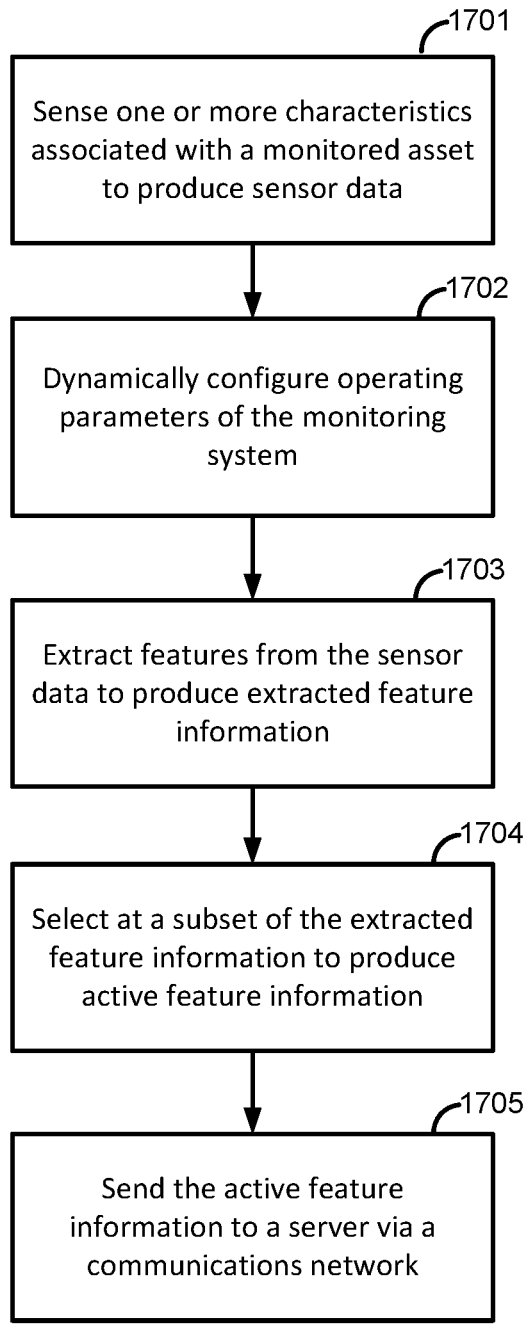
FIG. 17 is a flow diagram of an example process for operating a monitoring system.

FIG. 17 is a flow diagram of an example process for operating a monitoring system according to the disclosure. The sensor 102 provides the means for implementing the process illustrated in FIG. 17. The process illustrated in FIG. 17 is an example only and is not limiting. The example process may be altered, e.g. by having stages added, removed, rearranged, combined, performed concurrently, by having single stages split into multiple stages, or a combination thereof.

One or more characteristics associated with a monitored asset may be sensed to produce sensor data (stage 1701). The sensor(s) 308 may sense one or more characteristics of associated with a monitored asset 101. The sensor(s) 308 may include, but are not limited, magnetometers, accelerometers, light sensors, temperature sensors, fluid sensors, pressure sensors, optical sensors, radiation sensors, vibration sensors, chemical sensors, other types of sensors, or a combination thereof, may be utilized depending on the type of monitored asset for which sensor data is being collected. The sensor 102 may include more than one sensor 308, and may include more than one type of sensor.

Operating parameters for the monitoring system may be dynamically configured (stage 1702). The operating parameters of the sensor may be dynamically configured at least in part based on current known operating conditions of the monitored asset, the current prognosis of the monitoring system or combinations thereof, hereafter referred to as "current operating conditions." The current operating conditions may further include a state of the monitored asset, a state of the sensor 102, a state of the server 106, or a combination thereof. The sensor 102 may dynamically modify the operating parameters of one or more component of the sensor, such as the feature extraction unit 311, sensor configuration information 304 and/or sensor(s) 308 based on configuration information received from the server 106, such as in the example process illustrated in FIG. 18. For example, the operating parameters of the feature extraction unit 311 may select certain features in stages 1703 and 1704. The sensor 102 may also dynamically modify the operating parameters of one or more components of the sensor 102, such as the feature extraction unit 311, based on feature information extracted from the sensor data produced by the sensors 308, such as in the example process illustrated in FIG. 21.

Features may be extracted from the sensor data to produce extracted feature information (stage 1703). The feature extraction unit 311 of the sensor 102 may analyze the sensor data and to extract feature information. The sensor(s) 308 may produce a large quantity of sensor data. Not all of the sensor data may be relevant for the server 106 to generate prognosis information for the monitored asset 101.

Figure 21:
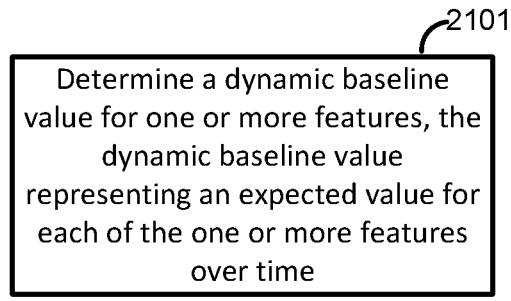
FIG. 21 is a diagram of an example of an additional stage that may be used to implement at least in part, stage 1702 of the process illustrated in FIG. 17.

A subset of the extracted feature information may be selected to produce active feature information (stage 1704). The subset of the extracted features may be selected at least in part based on current operating conditions of the monitoring system. The feature extraction unit 311 may implement one or more feature selection algorithms for selecting which features to include in the active feature information that is provided to the server 106. The feature selection by the feature extraction unit 311 may be influenced at least in part by feedback received from the server in the form of configuration information for the sensor 102. The server 106 may generate prognosis information based on the feature information being provided by the sensor(s) 102 associated with monitored asset(s) 101. The server 106 may send configuration information to the sensor(s) 102 that changes the features included in the active feature information that is reported to the server 106. For example, the prediction/classification unit 203 or the learning unit 208 may determine that a certain combination of features is indicative of a particular condition occurring with a particular monitored asset or type of monitored asset. The server 106 may send configuration information to the sensor(s) 102 to request that the sensors provide certain combinations of active feature information. This combination may be selected by the server 106 to include feature information that may be used to identify a set of most common conditions that typically occur with the particular monitored asset or a particular type of monitored asset. The feature extraction unit 311 of the sensor 102 may also build a dynamic baseline for a monitored asset 101 that may be used to determine expected feature information for that monitored asset, and the feature extraction unit 311 may include feature information for that monitored asset that has deviated from the dynamic baseline. FIG. 21 provides an example process for determining such a dynamic baseline.

The active feature information may be sent to the server via communications network (stage 1705). The active feature information may be sent to a server, such as the server 106, which may process the feature information as discussed above. The server 106 may generate prognosis information for the monitored asset 101 associated with the feature information, and to perform the various other processes discussed in the preceding examples.

Figure 18:
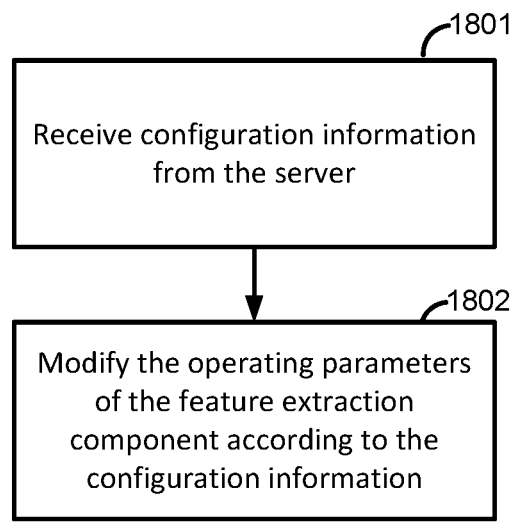
FIG. 18 is a flow diagram of an example process for modifying the operating parameters of a sensor.

FIG. 18 is a flow diagram of an example process for modifying the operating parameters of a sensor according to the disclosure. The sensor 102 provides the means for implementing the process illustrated in FIG. 18. The process illustrated in FIG. 18 is an example only and is not limiting. The example process may be altered, e.g. by having stages added, removed, rearranged, combined, performed concurrently, by having single stages split into multiple stages, or a combination thereof. The process illustrated in FIG. 18 may be used to implement, at least in part, stage 1702 of the process illustrated in FIG. 17.

Configuration information may be received from the server (stage 1801). The server 106 may generate configuration information for the sensor 102, and to send the configuration information to the sensor 102 via the network 105. The sensor 102 may receive the configuration information via the network interface 301. The sensor 102 may store the configuration information in the memory 302 as the sensor configuration information 304. The sensor configuration information 304 may also include configuration information that was previously stored in the memory 302 and may include configuration information that was determined at the sensor 102.

The operating parameters of the feature extraction component may be modified according to the configuration information (stage 1802). The processor 309 of the sensor 102 may modify the operating parameters of the sensor 102 according to the configuration information. The processor 309 may configure the rate at which the sensor(s) 308 produce sensor data according to the configuration information. The processor 309 may also configure the rate at which feature extraction is performed on the sensor data by the feature extraction unit 311, a rate at which the feature information is reported to the server 106, or combinations thereof. The configuration information may also be used to configure the feature extraction unit 311 to change the set of features extracted from the sensor data, to change the set of features included in the active feature information reported to the server, to modify one or more features, or a combination thereof. These examples do not limit the configuration information to these specific examples. The configuration information may be used to alter other operating parameters of the sensor 102 in addition to or instead of one or more of the examples discussed herein.

Figure 19:
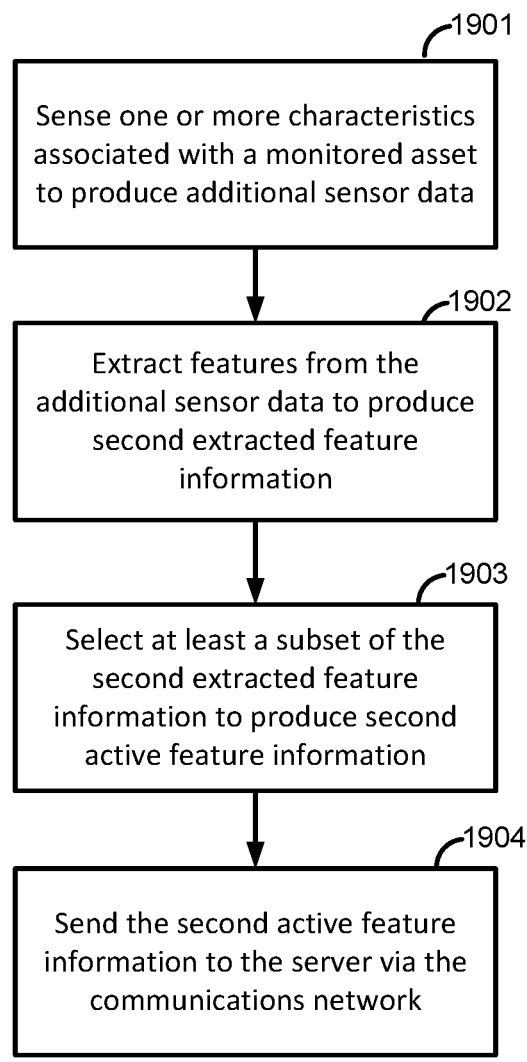
FIG. 19 is a flow diagram of an example process for operating a monitoring system.

FIG. 19 is a flow diagram of an example process for operating a monitoring system according to the disclosure. The sensor 102 provides the means for implementing the process illustrated in FIG. 19. The process illustrated in FIG. 19 is an example only and is not limiting. The example process may be altered, e.g. by having stages added, removed, rearranged, combined, performed concurrently, by having single stages split into multiple stages, or a combination thereof. The process illustrated in FIG. 19 may be used to implement at least in part additional stages of the processes illustrated in FIG. 18 or FIG. 22.

Figure 22:
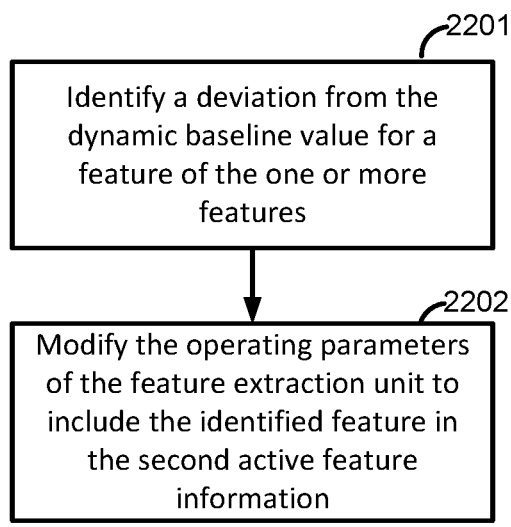
FIG. 22 is a flow diagram of an example process for modifying the operating parameters of a sensor.

One or more additional characteristics associated with the monitored asset may be sensed to produce additional sensor data (stage 1901). The operating parameters of the sensor 102 may be changed, for example, due to configuration information received from the server 106 or due to other changes that occur at the sensor. FIGS. 18 and 22 illustrate two example processes where the operating parameters of the sensor may change. The sensor may continue monitoring the monitored asset 101 after such a change in the operating parameters of the sensor 102.

Features may be extracted from the additional sensor data to produce second extracted feature information (stage 1902). The feature extraction unit 311 may extract feature information from the additional sensor data. The feature extraction unit 311 may determine at least a subset of the feature information to send to the server 106. The server 106 may use this additional feature information to determine prognosis information for the monitored asset 101.

At least a subset of the second extracted feature information may be selected to produce second active feature information (stage 1903). The feature extraction unit 311 may implement one or more feature selection algorithms for selecting which features to include in the active feature information that is provided to the server 106. The feature selection by the feature extraction unit 311 may be influenced at least in part by the changes to the operating parameters of the sensor 102.

The second active feature information may be sent to the server via the communications network (stage 1904). The second active feature information may be sent to a server, such as the server 106, which may process the feature information as discussed above. The server 106 may generate prognosis information for the monitored asset 101 associated with the second feature information, and to perform the various other processes discussed in the preceding examples.

Figure 20:
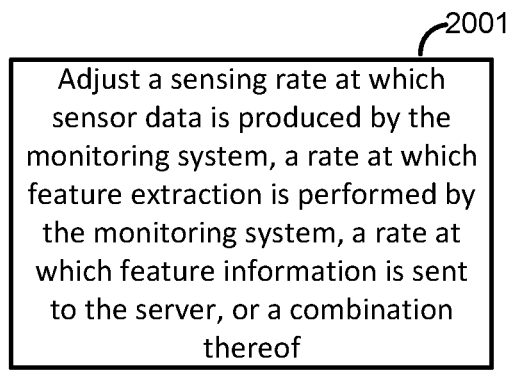
FIG. 20 is a diagram of an example of an additional stage that may be used to implement an additional stage of the process illustrated in FIG. 18.

FIG. 20 is a diagram of an example of an additional stage that may be used to implement an additional stage of the process illustrated in FIG. 18. The sensor 102 provides the means for implementing the additional stage illustrated in FIG. 20. The example illustrated in FIG. 20 is an example only and is not limiting.

A sensing rate at which sensor data is being produced by the monitoring system, a rate at which feature extraction is performed by the monitoring system, a rate at which feature information is sent to the server or a combination thereof may be adjusted (stage 2001). The configuration information received from the server 106 may be used configure various operating parameters of the sensor 102, including but not limited the sample rate at which the sensor data is produced by the sensor(s) 308, and the rate at which the feature information is provided to the server 106 by the sensor 102. The server 106 may also provide configuration information that specifies which features to include or not include in the feature information that is provided to the server 106 by the sensor 102.

FIG. 21 is a diagram of an example of an additional stage that may be used to implement at least in part, stage 1702 of the process illustrated in FIG. 17. The sensor 102 provides the means for implementing the additional stage illustrated in FIG. 21. The stage illustrated in FIG. 21 is an example only and is not limiting.

A dynamic baseline value may be determined for one or more features (stage 2101). The dynamic baseline value represents an expected value for each of the one or more features over time. The feature extraction unit 311 may develop the dynamic baseline over time based on observed sensor data for a monitored asset. In some implementations, the feature extraction unit 311 may be provided with default dynamic baseline information that may be used to provide an initial expected baseline values before the sensor 102 has had time to observe a sufficient amount of information to produce a dynamic baseline for a monitored asset. The default dynamic baseline information may be provided by the server 106, and may be based on attributes of the monitored asset, attributes of a plurality of similar monitored assets, expected environmental conditions at the location where the monitored asset is located, other factors that may influence one or more characteristic of the monitored asset that may be monitored by the sensor(s) 308. These other factors may include changes in the characteristic(s) of the monitored asset 101 that are monitored by the sensor(s) 308 that occur over time due to normal wear and tear experienced by the monitored asset 101. The dynamic baseline determined by the feature extraction unit 311 for this feature may take into account these changes in the expected value of the feature extracted from the sensor data over time. The server 106 may provide information as to expected changes in the patterns of these characteristic(s) over time that have been generated by observing the operation of the same or similar type of monitored asset over time. The feature extraction unit 311 may use this information when determining the dynamic baseline for the monitored asset.

In an example implementation to illustrate this concept, the feature extraction unit 311 may a feature related to a temperature of the monitored asset 101. The ambient temperature of the monitored asset 101 may vary over time. For example, the monitored asset 101 may be located in an outdoor area where the ambient temperature may vary over the course of the year due to the change in seasons and over the course of the day due to changes in temperature between day and night. The feature extraction unit 311 may obtain sensor information over time that reflects these changes and may use these to develop a dynamic baseline model for the temperature of the monitored asset 101. A similar approach may be used with other characteristics of the monitored asset 101. Furthermore, as discussed above, default information may be provided by the server that may serve as an initial baseline that may be adapted by the feature extraction unit 311 as sensor data is collected for a monitored asset 101 over time.

FIG. 22 is a flow diagram of an example process for modifying the operating parameters of a sensor according to the disclosure. The sensor 102 provides the means for implementing the process illustrated in FIG. 22. The process illustrated in FIG. 22 is an example only and is not limiting. The example process may be altered, e.g. by having stages added, removed, rearranged, combined, performed concurrently, by having single stages split into multiple stages, or a combination thereof. The process illustrated in FIG. 19 may be used to implement at least in part additional stages of the process illustrated in FIG. 21.

A deviation from the dynamic baseline value may be identified for a feature of the one or more features (stage 2201). The feature extraction unit 311 may determine a particular feature has deviated from an expected dynamic baseline value for that feature. The feature extraction unit 311 may identify such a deviation in response to the feature value extracted from the sensor data falling outside of an expected range from the dynamic baseline value for that feature. The feature extraction unit 311 may determine that one or both of these features has deviated from the dynamic baseline by more than a predetermined amount. Each type of feature information may be associated with a predetermined threshold indicative of a deviation from the dynamic baseline value for that type of feature.

Referring back to the to pump example discussed above with respect to FIG. 3, the feature extraction unit 311 in this example is configured to extract feature information related to: (1) flow rate from the pump and (2) vibration data from at least one point on the housing of the pump. The feature extraction unit 311 is configured to produce a dynamic baseline over time that represents expected values of the flow rate and vibration level data features over time. The feature extraction unit 311 may determine that the flow rate has deviated from the baseline where the flow is lower than or higher than the expected flow rate value of the dynamic baseline by more than a predetermined threshold or by a predetermined percentage. The feature extraction unit 311 may determine that the vibration level of the pump has deviated from the expected vibration level value of the dynamic baseline where the vibration level exceeds the expected vibration level by more than a predetermined threshold or by a predetermined percentage. This example illustrates concepts disclosed herein and does not limit the monitored asset to a pump or the features extracted by the feature extraction unit 311 to these specific features.

The operating parameters of the feature extraction unit may be modified to include the identified feature in the second active feature information (stage 2202). Such deviations from the dynamic baseline value for a monitored asset 101 may be indicative of a condition of the monitored asset that may require repairs or maintenance. The sensor 102 may include such features in the feature information that is provided to the server in stage 1704 of the process illustrated in FIG. 17. Furthermore, the server 106 may provide feedback to the sensor 102 that includes configuration information for changing one or more operating parameters of the sensor 102, such as that discussed in the example processes illustrated in FIGS. 18 and 20 and other examples discussed in the preceding examples.

Figure 23:
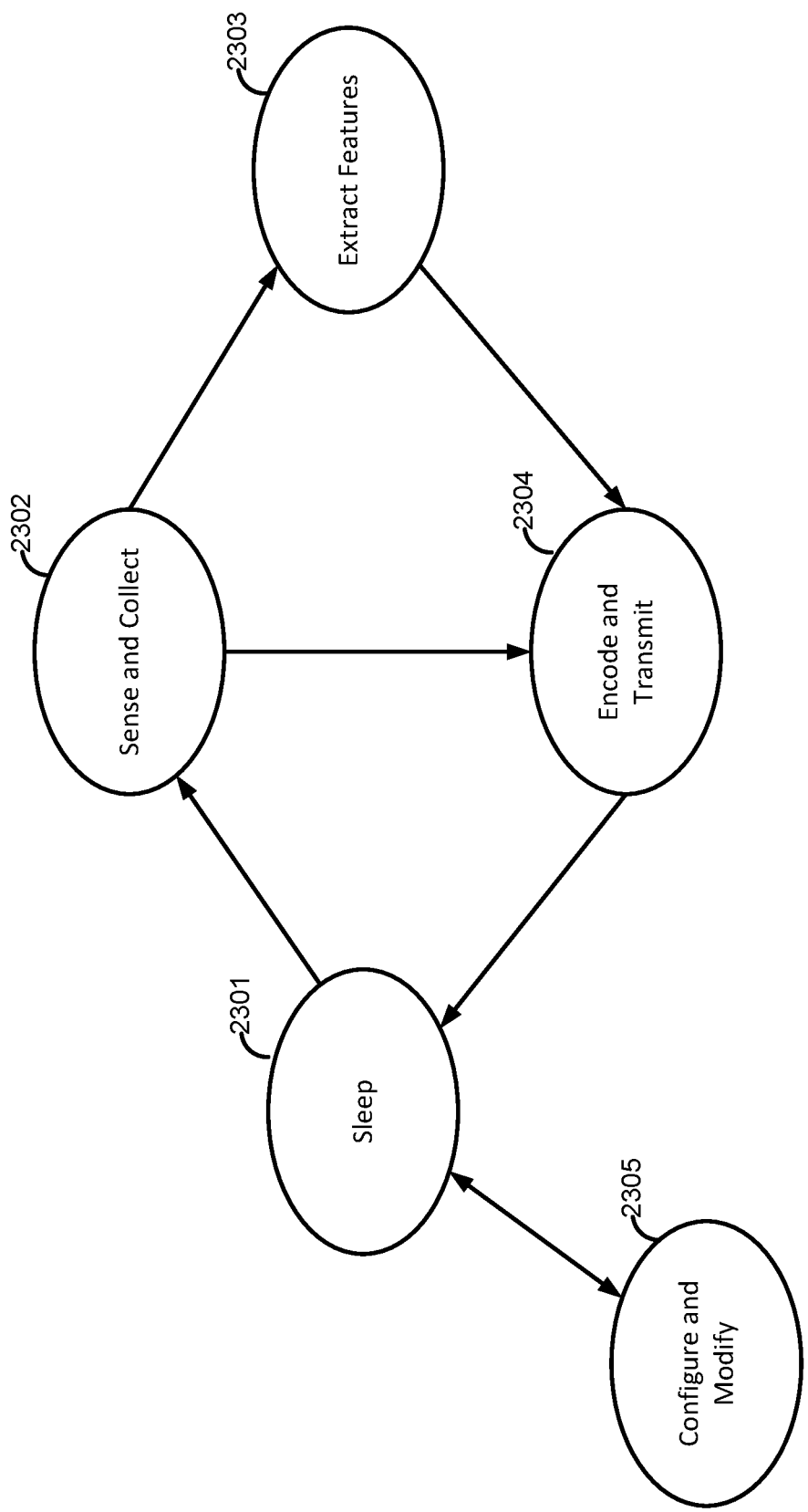

FIG. 23 is an example state diagram illustrating an example of various states that a sensor, such as the sensor 102, may transition between according to the disclosure. The state diagram illustrated in FIG. 23 is an example only and is not limiting. The example state may be altered, e.g. by having states added, removed, rearranged, combined, performed concurrently, by having single states split into multiple states, or a combination thereof.

The sensor 102 may enter into a sleep state 2301. The sensor 102 may enter into the sleep state periodically to save power, particularly where the sensor 102 is battery powered. In some implementations, the sensor 102 may not enter into a sleep state. In particular, the sensor 102 may not enter into the sleep state where the sensor 102 has an external power source and is not reliant on a battery or other onboard power source that may be exhausted.

The sensor 102 may enter into the configure and modify state 2305 from the sleep state 2301. The sensor 102 may enter into the configure and modify state 2305 in response to receiving sensor configuration information from the server 106. The server 106 may send sensor configuration information to the sensor 102. The sensor 102 may use to reconfigure one or more operating parameters of the sensor 102 without requiring the sensor 102 to be manually reconfigured or replaced. The sensor 102 may configure the rate at which the sensor(s) 308 produce sensor data according to the configuration information. The sensor 102 may also configure the rate at which feature extraction is performed on the sensor data, a rate at which the feature information is reported to the server 106, or combinations thereof. The configuration information may also be used to change the set of features extracted from the sensor data, to change the set of features included in the active feature information reported to the server, to modify one or more features, or a combination thereof. These examples do not limit the configuration information to these specific examples. The configuration information may be used to alter other operating parameters of the sensor 102 in addition to or instead of one or more of the examples discussed herein. The sensor 102 may return to the sleep state from the configure and modify state 2305. In implementations where the sensor 102 is not configured to enter into the sleep state, the sensor 102 may enter into the configure and modify state 2305 in response to receiving sensor configuration information from the server 106 while in another of the state illustrated in FIG. 23.

The sensor 102 may enter into a sense and collect state 2302 from the sleep state 2301. The sensor 102 may transition from the sleep state to the sense and collect state 2302 in which the sensor(s) 308 of the sensor 102 are configured to produce sensor data. The sensor 102 may transition from the sleep state 2301 to the sense and collect state 2302 in response to an event or in response to the expiration of a timer. The sensor 102 may respond to certain types of events, such as a wakeup signal or sensor configuration information being received from the server 106, a signal received from a technician or other user, or an event occurring at the monitored asset 101 for which the sensor 102 is configured to exit the sleep state 2301. The sensor 102 may remain in the sense and collect state 2302 for a predetermined period of time, based on the sensor data being collected by the sensors(s) 308 of the sensor 102, based on an amount of data collected by the sensor(s), based on sensor configuration information received from the server, or a combination of one or more of these factors. The sensor(s) 308 may measure a single characteristic of the monitored asset 101 or the operating environment in which the monitored asset 101 is disposed, such as temperature or humidity. Some sensor(s) 102 may include more than one sensor 308. Other types of sensors may be included, such as but not limited to accelerometers, gyroscopes, infrared or ultraviolet sensors, and acoustic sensors.

The sensor 102 may transition from the sense and collect state 2302 to an encode and transmit state 2304 or an extract features state 2303. The sensor 102 may transition to the encode and transmit state 2304 from the sense and collect state 2302 where the sensor 102 is configured to transmit raw sensor data to the server 106. The server 106 may send a request to the sensor 102 for raw sensor data or configuration information obtained from the server 106 may indicate that the sensor 102 should transmit raw sensor data to the server 106. The sensor 102 may process the raw sensor data before transmitting the raw sensor data to the server 106. For example, the sensor 102 may compress the raw sensor data, to encrypt the raw sensor data, to perform other preprocessing on the raw sensor data, or a combination thereof.

While in the extract features states 2303, the sensor 102 may extract feature information from the sensor data obtained by the sensor(s) 308 of the sensor. The features included in the feature information may be used as classification variables by the classification aspect of the predictive algorithms of the server 106. When training the predictive algorithms, the predictive algorithms may be provided with tagged or labeled feature information that has been associated with a label that indicates that the feature information is indicative of a possible condition or imminent occurrence of the possible condition at the monitored asset 101. Once the predictive algorithms have been trained, the sensor 102 may provide untagged feature information from the sensor(s) 102 associated with a monitored asset, and the predictive algorithms may attempt to determine whether the monitored asset 101 is experiencing a possible condition or the possible condition is imminent. The feature information may be extracted from the sensor data using algebraic expressions, statistical analysis, or a combination thereof. Some examples of the types of classification variables of interest that may be extracted as feature information associated with vibration of the monitored asset 101 include but are not limited to the Root Mean Square Amplitude (RMS) of the vibration, the crest factor of the vibration, the shape factor of the vibration, the mean point of the vibration, the skewness of the vibration, the kurtosis of the vibration, and/or other such aspects of the vibration that may be computing in a time or frequency domain. Other types of feature information may be extracted from the sensor data based on the type of sensor data being analyzed for feature extraction.

The feature information produced by the sensor is used to by predictive algorithms of the server 106 to determine whether there is a fault or change in condition with the monitored asset 101 that may require maintenance or repairs to be performed on the monitored asset 101. Performing the feature extraction at the sensor 102 and analyzing the feature information at the server 106 may provide an advantage over systems which rely on the sensor to diagnose a fault or other condition for the device, because the predictive algorithms may combine feature information received from multiple sensors associated with the monitored asset 101 to determine the prognosis information. To illustrate this concept, in a conventional system, a rotor may have a first sensor and second sensor disposed at opposite ends of the rotor. Relying on sensor information at the first or the second sensor may not be sufficient to clearly identify an imbalance condition with the rotor. However, in an example implementation of techniques disclosed herein, a first sensor 102 at one end of the rotor and a second sensor 102 at the opposite end of the rotor. The first and second sensors may provide feature information to the server 106, which may include information such as phase differences detected by each of the sensors 102. The combination of the feature information from the first and second sensors 102 may be sufficient for the predictive algorithms to recognize that an imbalance condition has occurred with the rotor. The use of multiple sensors that may also comprise more than one type of sensor 308 may provide more a more robust set of feature information that may be used by the predictive algorithms and may also be used to provide a more robust set of tagged feature information that may be used to refine the predictive algorithms used by the server as the prognosis information generated by the server 106 is validated with service information provided by users who assess the condition of the monitored asset 101 in response to the prognosis information.

The sensor 102 may transition from the extract features state 2303 to the encode and transmit state 2304 where the feature information extracted by the sensor 102 is transmitted to the server 106 via the wireless network interface of the sensor 102. The sensor 102 may process the feature information before transmitting the feature information to the server 106. For example, the sensor 102 may compress the feature information, to encrypt the feature information, to perform other processing on the feature information, or a combination thereof. In some implementations, the sensor 102 may identify a subset of feature information that includes data that appears to be more significant. For example, a subset of the feature information in which the feature values deviated from the expected baseline values for the features. Other criteria may also be used to determine which subset of the feature information to select for transmission to the server 106. For example, the sensor 102 may report 10 highest dominant samples for a particular type of sensor data. The sensor 102 may be further configured to identify that the subset of these samples that contain most of the details of interest, then that subset may be selected. For example, if four of the samples include 99% of the energy of the ten samples, then the just those four samples may be transmitted to the server 106. This approach may reduce power consumption by the device and reduce the amount of data being transmitted by the sensors 102. In some environments, hundreds or thousands of such devices may be deployed. After transmitting the feature information to the server 106, the sensor 102 may transition back to the sleep state 2301.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

If implemented in-part by hardware or firmware along with software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

What is claimed is:

1. A method for operating a monitoring system, the method comprising:
    sensing one or more characteristics associated with a monitored asset to produce sensor data;
    dynamically configuring one or more operating parameters of a feature extraction component of the monitoring system based at least in part on one or more current operating conditions of the monitoring system;
    extracting one or more extracted features from the sensor data using the feature extraction component, in accordance with the one or more operation parameters of the feature extraction component, to produce extracted feature information;
    selecting, based at least in part on the one or more current operating conditions of the monitoring system, at least a subset of the extracted feature information using the feature extraction component to produce active feature information; and
    sending, through a communications network, the active feature information to a server.

2. The method of claim 1, wherein dynamically configuring the one or more operating parameters of the feature extraction component of the monitoring system further comprises:
    receiving configuration information from the server; and
    modifying one or more of the one or more operating parameters of the feature extraction component of the monitoring system according to the configuration information.

3. The method of claim 2, wherein the configuration information indicates a change in a sleep period of the monitoring system, sample rate of the monitoring system, or both.

4. The method of claim 2, wherein the configuration information identifies one or more features to add to the active feature information, one or more features to remove from the active feature information, or one or more features of the active feature information to modify; or a combination thereof.

5. The method of claim 4, wherein the extracted features are first extracted features, and the method further comprises:
sensing one or more of the one or more characteristics associated with the monitored asset to produce additional sensor data;
extracting second extracted features from the additional sensor data using the feature extraction component to produce second extracted feature information;
selecting at least a subset of the second extracted feature information using the feature extraction component to produce second active feature information; and
sending, via the communications network, the second active feature information to the server.

6. The method of claim 2, wherein the configuration information from the server comprises rate change information, the method further comprising:
adjusting a sensing rate at which the sensor data is produced by the monitoring system, a rate at which feature extraction is performed by the monitoring system, a rate at which feature information is sent to the server, or a combination thereof, based on the rate change information.

7. The method of claim 1, wherein dynamically configuring the one or more operating parameters of the feature extraction component of the monitoring system further comprises:
determining a dynamic baseline value for one or more of the extracted features, wherein the dynamic baseline value represents an expected value for each of the one or more extracted features over time.

8. The method of claim 7, further comprising:
identifying a deviation in the dynamic baseline value for an identified feature of the One or more extracted features; and
modifying the one or more operating parameters of the feature extraction component to include the identified feature in the subset of the extracted feature information.

9. The method of claim 8, wherein the extracted features are first extracted features, and the method further comprises:
sensing one or more of the one or more characteristics associated with the monitored asset to produce additional sensor data;
extracting second extracted features from the additional sensor data using the feature extraction component to produce second extracted feature information;
selecting at least a subset of the second extracted feature information using the feature extraction component to produce second active feature information wherein feature information for the identified feature is included in the second active feature information; and
sending, via the communications network, the second active feature information to the server.

10. A monitoring system comprising:
a sensor configured to sense one or more characteristics associated with a monitored asset and to produce sensor data;
a wireless transceiver configured to transmit data to and receive data from a server via a communication network; and
a processor configured to:
obtain the sensor data from the sensor;
dynamically configure one or more operating parameters of a feature extraction component of the monitoring system based at least in part on one or more current operating conditions of the monitoring system;
extract one or more extracted features from the sensor data using the feature extraction component, in accordance with the one or more operation parameters of the feature extraction component, to produce extracted feature information;
select, based at least in part on the one or more current operating conditions of the monitoring system, at least a subset of the extracted feature information using the feature extraction component to produce active feature information; and
send the active feature information to the server using the wireless transceiver.

11. The monitoring system of claim 10, wherein the processor being configured to dynamically configure the one or more operating parameters of the feature extraction component of the monitoring system is further configured to:
receive configuration information from the server via the wireless transceiver; and
modify one or more of the one or more operating parameters of the feature extraction component of the monitoring system according to the configuration information.

12. The monitoring system of claim 11, wherein the configuration information indicates a change in a sleep period of the monitoring system, sample rate of the monitoring system, or both.

13. The monitoring system of claim 11, wherein the configuration information identifies one or more features to add to the active feature information, one or more features to remove from the active feature information, or both.

14. The monitoring system of claim 13, wherein the extracted features are first extracted features, and wherein the sensor is further configured to:
sense one or more of the one or more characteristics associated with the monitored asset to produce additional sensor data, and wherein the processor is further configured to:
extract second extracted features from the additional sensor data using the feature extraction component to produce second extracted feature information;
select at least a subset of the second extracted feature information using the feature extraction component to produce second active feature information; and
send, via the communications network, the second active feature information to the server.

15. The monitoring system of claim 11, wherein the configuration information from the server comprises rate change information, and wherein the processor is further configured to:
adjust a sensing rate at which the sensor data is produced by the monitoring system, a rate at which feature extraction is performed by the monitoring system, a rate at which feature information is sent to the server, or a combination thereof, based on the rate change information.

16. The monitoring system of claim 10, wherein to dynamically configure the one or more operating parameters of the feature extraction component of the monitoring system the processor is further configured to:

determine a dynamic baseline value for one or more of the extracted features features, wherein the dynamic baseline value represents an expected value for each of the one or more extracted features over time.

17. The monitoring system of claim 16, wherein the processor is further configured to:
identify a deviation in the dynamic baseline value for an identified feature of the one or more features; and
update the one or more operating parameters of the feature extraction component to include the identified feature in the subset of the extracted feature information.

18. A non-transitory, computer-readable medium, having stored thereon computer-readable instructions for operating a monitoring system, comprising instructions configured to cause the monitoring system to:
sense one or more characteristics associated with a monitored asset to produce sensor data;
dynamically configure one or more operating parameters of a feature extraction component of the monitoring system based at least in part on one or more current operating conditions of the monitoring system;
extract one or more extracted features from the sensor data using the feature extraction component, in accordance with the one or more operation parameters of the feature extraction component, to produce extracted feature information;
select, based at least in part on the one or more current operating conditions of the monitoring system, at least a subset of the extracted feature information using the feature extraction component to produce active feature information; and
send, through a communications network, the active feature information to a server.

19. The non-transitory, computer-readable medium of claim 18, wherein the instructions configured to cause the monitoring system to dynamically configure the one or more operating parameters of the feature extraction component of the monitoring system further comprise instructions configured to cause the monitoring system to:
receive configuration information from the server; and
modify one or more of the one or more operating parameters of the feature extraction component of the monitoring system according to the configuration information.

20. The non-transitory, computer-readable medium of claim 19, wherein the configuration information indicates a change in a sleep period of the monitoring system, sample rate of the monitoring system, or both.

21. The non-transitory, computer-readable medium of claim 19, wherein the configuration information identifies one or more features to add to the active feature information, one or more features to remove from the active feature information, or one or more features of the active feature information to modify, or a combination thereof.

22. The non-transitory, computer-readable medium of claim 21, wherein the extracted features are first extracted features, and the non-transitory, computer-readable medium further comprises instructions configured to cause the monitoring system to:
sense one or more of the one or more characteristics associated with the monitored asset to produce additional sensor data;
extract second extracted features from the additional sensor data using the feature extraction component to produce second extracted feature information;
select at least a subset of the second extracted feature information using the feature extraction component to produce second active feature information; and
send, via the communications network, the second active feature information to the server.

23. The non-transitory, computer-readable medium of claim 19, wherein the configuration information from the server comprises rate change information, and further comprising instructions configured to cause the monitoring system to:
adjust a sensing rate at which the sensor data is produced by the monitoring system, a rate at which feature extraction is performed by the monitoring system, a rate at which feature information is sent to the server, or a combination thereof, based on the rate change information.

24. The non-transitory, computer-readable medium of claim 18, wherein the instructions configured to cause the processor to dynamically configure the one or more operating parameters of the feature extraction component of the monitoring system further comprise instructions configured to cause the monitoring system to:
determine a dynamic baseline value for one or more of the extracted features, wherein the dynamic baseline value represents an expected value for each of the one or more extracted features over time.

25. The non-transitory, computer-readable medium of claim 24, further comprising instructions configured to cause the monitoring system to:
identify a deviation in the dynamic baseline value for an identified feature of the one or more extracted features; and
update the one or more the operating parameters of the feature extraction component to include the identified feature in the subset of the extracted feature information.

* * * * *